US011835546B1

(12) United States Patent
Daugela

(10) Patent No.: US 11,835,546 B1
(45) Date of Patent: *Dec. 5, 2023

(54) CHARACTERIZATION OF NANOINDENTED AND SCRATCH INDUCED ACCOUSTIC EVENTS

(71) Applicant: Nanometronix, LLC, Bloomington, MN (US)

(72) Inventor: Antanas Daugela, Bloomington, MN (US)

(73) Assignee: NANOMETRONIX LLC, Bloomington, MN (US)

( * ) Notice: Subject to any disclaimer, the term of this patent is extended or adjusted under 35 U.S.C. 154(b) by 76 days.

This patent is subject to a terminal disclaimer.

(21) Appl. No.: 17/827,759

(22) Filed: May 29, 2022

Related U.S. Application Data

(63) Continuation-in-part of application No. 17/393,462, filed on Aug. 4, 2021, now Pat. No. 11,346,857.

(51) Int. Cl.
*G01Q 30/04* (2010.01)

(52) U.S. Cl.
CPC .................... *G01Q 30/04* (2013.01)

(58) Field of Classification Search
CPC ....................................... G01Q 30/04
USPC .............. 850/1, 2, 3, 4, 5, 6, 7, 10
See application file for complete search history.

(56) References Cited

U.S. PATENT DOCUMENTS

| | | | |
|---|---|---|---|
| 5,965,896 A | 10/1999 | Marton | |
| 6,945,097 B2 | 9/2005 | Jardret et al. | |
| 7,107,694 B2 | 9/2006 | Yang et al. | |
| 7,289,202 B2 | 10/2007 | Groess et al. | |
| 7,492,451 B2 | 2/2009 | Vaez-Iravani et al. | |
| 7,543,519 B2 | 6/2009 | Chudoba et al. | |
| 7,624,640 B2 | 12/2009 | Maris et al. | |
| 7,649,624 B1 | 1/2010 | Xin et al. | |
| 7,814,565 B2 | 10/2010 | Kim et al. | |
| 7,845,214 B2 | 12/2010 | Hsu et al. | |

(Continued)

FOREIGN PATENT DOCUMENTS

| | | |
|---|---|---|
| WO | 9115747 A1 | 10/1991 |
| WO | 2013019717 A1 | 2/2013 |

OTHER PUBLICATIONS

Antanas Daugela and Jurgis Daugela, "Opto-nanomechanical test instrument in mechanical characterization of DLC coated MEMS devices", Microsystem technologies, https://doi.org/10.1007/s00542-020-04800-1.

*Primary Examiner* — Nicole M Ippolito
(74) *Attorney, Agent, or Firm* — Dietz Law Office LLC

(57) ABSTRACT

A method of creating and characterizing a representative image or signal transform of the surface of an object from acoustic emissions or ultrasonic signals of a multimode ultrasonic probe tip and transducer integrated into a micro tool, such as a nano indenter or a nano indenter interfaced with a Scanning Probe Microscope (SPM). The representative image or renderings may be utilized to predict mechanical properties or characteristics of the sample, including topography, fracture patterns, indents and artifacts. The tip component is configured to operate at multi-resonant frequencies providing sub-nanometer vertical resolution. The tip component may be quasi- statistically calibrated and deep learning iterative image comparison and characterization may be utilized to derive mechanical properties of a sample.

20 Claims, 22 Drawing Sheets

(56) References Cited

U.S. PATENT DOCUMENTS

| | | |
|---|---|---|
| 7,973,547 B2 | 7/2011 | Nitsch et al. |
| 8,003,939 B2 | 8/2011 | Jindai et al. |
| 8,087,282 B2 | 1/2012 | Sawa et al. |
| 8,186,210 B2 | 5/2012 | Hangen |
| 8,212,995 B2 | 7/2012 | Koehler et al. |
| 8,234,912 B2 | 8/2012 | Suarez-Rivera et al. |
| 8,245,318 B2 | 8/2012 | Jin et al. |
| 8,281,648 B2 | 10/2012 | Leroux |
| 8,294,406 B2 | 10/2012 | Gajjar |
| 8,302,480 B2 | 11/2012 | Maris et al. |
| 8,310,128 B2 | 11/2012 | Ferreira et al. |
| 8,322,220 B2 | 12/2012 | Prater et al. |
| 8,353,060 B2 | 1/2013 | Watanabe et al. |
| 8,370,960 B2 | 2/2013 | Proksch et al. |
| 8,387,161 B2 | 2/2013 | Finlan et al. |
| 8,448,261 B2 | 5/2013 | Paissan et al. |
| 8,453,498 B2 | 6/2013 | Warren et al. |
| 8,479,310 B2 | 7/2013 | Humphris |
| 9,753,016 B1 | 9/2017 | Daugela |
| 9,885,691 B1 | 2/2018 | Daugela |
| 11,346,857 B1 * | 5/2022 | Daugela ................. G01N 29/46 |
| 2009/0272191 A1 | 11/2009 | Maris et al. |
| 2011/0174036 A1 | 7/2011 | Mauvoisin |
| 2011/0231966 A1 | 9/2011 | Passian et al. |
| 2012/0281207 A1 | 11/2012 | Yoshimizu et al. |

\* cited by examiner

760

CHARACTERIZATION OF NANOINDENTED AND SCRATCH INDUCED ACCOUSTIC EVENTS

CROSS-REFERENCE TO RELATED APPLICATIONS

This application claims the filing benefit and priority of U.S. Non-Provisional patent application Ser. No. 17/393,462 filed Aug. 4, 2021 the contents of which are incorporated herein by reference in their entireties.

FEDERAL SPONSORSHIP

Not Applicable

Joint Research Agreement

Not Applicable

TECHNICAL FIELD

This invention pertains generally to utilizing a micro tool probe to characterize micro surface areas of an object. More particularly, the invention pertains to a probe Nano-indenter, Scanning Probe Microscopy (SPM), Atomic Force Microscopy (AFM), Scanning Electron Microscopy (SEM), Transmission Electron Microscopy (TEM), combinations thereof, or other similar tools having a probe tip. The method in accordance with the present invention creates a rendering (an image or transform) derived from an association of signals (acoustic or ultrasonic) to surface contact of the probe tip. Further, in accordance with the invention a user may classify the renderings dependent upon prior load-unload (LUL) curve mapping and other a-priori knowledge, all while machine/deep learning is employed in an unsupervised mode for sorting out characteristic joint time frequency domain signatures derived from the signal. Prior unknown or unclassified renderings can be added by the operator to the quantified data base dependent upon statistical significance and newly generated knowledge.

BACKGROUND

Prior micro tools have determined certain characteristics of a material, however the prior known tools include limitations that are overcome by the present invention. For example, quantitative nano scale characterization devices such as nanoindenters and use of Atomic Force Microscopes (AFM) are very effective at rendering general material properties of a sample, such as elasticity modulus or sample hardness, or derive elastic contact properties of a sample, however these tools are limited to quasi-static or low frequency dynamic response. Subtle nanoscale volumetric changes occur during a materials' phase transformation, the plasticity induced yield stress onset, twining, thin film fracture modes that are not affectively characterized by current nano scale characterization devices. Also probe contact of these areas typically generates high frequency elastic and surface acoustic waves generally called by Acoustic Emissions (AE). In addition, monitoring the dynamics of multi-cycling loads at nanoscale provide a user with the knowledge of the critical fatigue cycles which is a very important parameter in describing reliability of thin film interfaces. The faster test can be achieved by a higher multi-cycle loading frequency. Thus, hundreds of kHz or even a MHz multi-cycling shorten nano fatigue tests to minutes and seconds instead of hours. It would be desirably to provide a micro tool capable of identifying micro locations on the sample where these changes (including nano fatigue induced changes) occur and provide reliable material characterizations at the identified locations.

Passive acoustic wave monitoring in polycrystalline metallic materials has been utilized as a non-destructive defect detection tool. From the instrumentation/metrology perspective, the idea behind simultaneous acoustic emission monitoring and quasi-static nanomechanical testing is to perform complementing measurements at two or more well-spaced frequency ranges simultaneously. In contrast to dynamic nanoindentation applications, instrument structural modes and acoustic emission monitoring ranges are separated by several orders of magnitude which allow simultaneous quasi-static and acoustic monitoring without any modal interference. Modal interferences may occur at conditions when the nanomechanical test instrument is being operated at frequencies above the rigid body mode frequency, where higher modes are being excited. This phenomenon complicates the interpretation of results requiring complex identification in order to separate the instrument's and materials' responses. Typical rigid body modes for nanoindenters are between 10 and 300 Hz. Recent commercially available MEMS based nanoindenters extend that range to several kHz. On the other hand, a typical acoustic emission monitoring range is 50 kHz-2 MHz.

Simultaneous nanoindentation and AE monitoring systems have been used in an attempt to correlate quantitative acoustic wave properties with local contact materials phenomena such as the plasticity yield point initiation for W (100). Although attempts were made to identify correlations between load-unload curves and integrated AE waveforms, the nanoindentation load-unload curves did not reveal any artifacts or excursions even though AE events were observed from phase transformation. The complexity of the contact phenomena renders difficulty to use a single number or waveform integrated energy characterizing event to correlate or "fingerprint" the contact phenomena. Several attempts have been made to look at the characteristic acoustical signatures via signal decomposition techniques: such as, Short Time Fourier Transforms (STFT), wavelets or CWT coefficients. However, the prior acoustic signature recognition concepts lacked a systematic framework capable of classifying and predicting the outcome. The present invention is able to utilize AE events to "fingerprint" the contact phenomena. Similar to the passively acquired Acoustic Emission, the present invention is also able to utilize reflected ultrasonic signals taken during nano fatigue monitoring to provide a fingerprint and classify the contact phenomena with the inventions robust deep learning methodology.

SUMMARY

Embodiments according to aspects of the invention include a method and device to characterize nanoindentation/scratch induced acoustic signal events or ultrasonic wave propagation induced signals (ultrasonic signals) using an ultrasonic nanoindentation tip running in the passive mode associated with acoustic events and running in an active mode associated with nanofatigue test. The acoustic events are detected in combination with an Acoustic Emission sensor. The ultrasonic tip acquires signals associated with the nanoindentation/scratch and ultrasonically induced nanofatigue tests. The method consists of JTF domain signal transform, signal entropy filtering, and Machine/Deep learning implemented into control software/hardware that is synchronized with signal data acquisition and nanoindentation hardware. The hardware is comprised of an ultrasonic tip/Acoustic Emission sensor, fast DAC/ADC board, signal conditioner, and nanomechanical test instrument. During nanofatigue testing the nanoindentation tip actively oscillates at a chosen resonant frequency and is capable of acquiring signals within 20 kHz-4 MHz bandwidth. The synergy of Machine/Deep Learning together with JTF domain signal processing and monitoring hardware renders possible a correlation and characterization of the micro areas on a surface.

In accordance with aspects of the invention, deep learning is utilized for the characterization of acoustic and nanofatigue events. The overall objective is to utilize deep learning neural network classification for typical nanoindentation induced small data sets of several hundred events (either acoustic emission (AE) events or nanofatigue events). The combination of Continuous Wavelet Transforms (CWT) based signal decomposition and entropy minimization based filtering creates topographic scattergram of the events. The image recognition neural network trains on those scattergrams according to specified classifications. This creates signature maps that can be associated with nanoindentation induced specific materials phenomena which are then used in the classification/characterization of unidentified events.

A combination micro tool probe tip and ultrasonic transducer capable of transmitting longitudinal resonant high frequency ultrasonic waves is utilized to obtain signals associated with acoustic emission events correlated with probe tip contacts of a multilayered sample. Alternatively, the probe tip is utilized to obtain ultrasonic signals corresponding with nanofatigue events. A preferred resolution may be obtained by changing different longitudinal vibrations and torsional oscillation modes of the multi-mode ultrasonic transducer in contact with the sample. The obtained acoustic output signal represents acoustic impedance of the sample which is a function of the material properties.

Also described herein is an ultrasonic tip system for metrology and 2D topology type tools. The ultrasonic tip system includes a probe tip, a comparator, a wave guide, and an energy source. The probe tip includes an ultrasonic transducer/receiver that may direct ultrasonic waves towards a sample and an elongated wave guide coupled to the ultrasonic transducer, wherein the wave guide may vibrate longitudinally and oscillates rotationally dependent upon a frequency of the ultrasonic waves from the ultrasonic transducer. This type of ultrasonic tip system attached to a nanoindenter shaft is illustrated in FIG. 3 of the Figures. The comparator compares obtained contact acoustic impedance with measured electromechanical impedance which may be utilized to determine characteristics of a sample. In the system of the invention the transducer propagates ultrasonic waves at a resonant frequency with a range of frequencies between 100 kHz to 2 MHz. Those skilled in the art will appreciate that certain resonant frequencies wave propagations may be preferred dependent upon the material characteristic being determined.

Embodiments according to aspects of the invention also include a method of characterizing micro regions of a surface of an object. The method may include calibrating a metrology or topology micro tool probe. When calibrating, the control of the ultrasonic probe tip is adjusted so that waves propagate through the elongated column at a resonant frequency with a range of frequencies between 100 kHz to 2 MHz. During calibration the boundary conditions for the resonant frequency may be determined. Once calibrated, the micro tool is controlled to contact a micro region of a surface of an object utilizing the micro tool probe. Acoustic emission event signals or ultrasonic signals are acquired that are associated with contact between the probe tip and the surface of the object. The micro tool system correlates acoustic emission event signals or ultrasonic signals with data points on a load unload curve. Images or renderings are created that represent correlated acoustic emission event signals or ultrasonic event signals respectively with LUL events. These images or renderings are compared with images or rederings having known material characteristics to thereafter characterize the associated micro region of the surface of the object.

The method in accordance with aspects of the invention may further comprise decomposing the acquired acoustic emission event signal or ultrasonic signal and representing the signal in a joint time-frequency domain. The joint time frequency domain includes at least one of continuous wavelet transforms, matching pursuit, Wigner-Ville, curvelets, ridgelets, and shearlets. Also, the joint time frequency domain may consist of deterministic, stochastic and harmonic components. Further, characterizing the micro region of the surface of the object may include the use of convolutive neural networks (CNN) or long-short term memory (LSTM) networks.

The micro tool probe of the present invention is particularly well suited for use with a micro tool probe tip of a metrology or topology tool that includes a casing having an enclosed bottom and top, a probe tip holder having an end extending out of the bottom of the casing, a probe tip coupled to the probe tip holder, a support ring engaged with the probe tip holder to support the probe tip holder above the bottom of the casing, a micro actuator engaged to the support ring, an acoustic sensor contained by the casing and engaged to the support ring, a signal conditioner and JTF domain transforms, and an image generator. The micro actuator includes a first planar spring, a second planar spring, and a spacer sandwiched between the first planar spring and the second planar spring. The micro tool probe may include an acoustic sensor that is capable of acquiring acoustic emission event signals within a 20 kHz-4 MHz bandwidth.

Embodiments according to aspects of the invention may further include a signal conditioner coupled to the acoustic sensor. Also, the first and second planar springs are constructed of a shape memory alloy. The first and second planar springs may include a thin film piezo layer deposited on planar surfaces of the first and second planar springs. Actuation of the first and second planar springs is accomplished by applying an electrical voltage potential to the first and second planar springs. In accordance with aspects of the invention, the probe tip may include the acoustic sensor oriented above, below, or integrated with the probe tip. Also, the micro actuator may provide quasi-static load on contact between the probe tip and an object.

The accompanying drawings, which are incorporated in and constitute a portion of this specification, illustrate embodiments of the invention and, together with the detailed description, serve to further explain the invention. The embodiments illustrated herein are presently preferred; however, it should be understood, that the invention is not limited to the precise arrangements and instrumentalities shown. For a fuller understanding of the nature and advantages of the invention, reference should be made to the detailed description in conjunction with the accompanying drawings.

DESCRIPTION OF THE DRAWINGS

In the various figures, which are not necessarily drawn to scale, like numerals throughout the figures identify substantially similar components.

DETAILED DESCRIPTION

Figure 1:
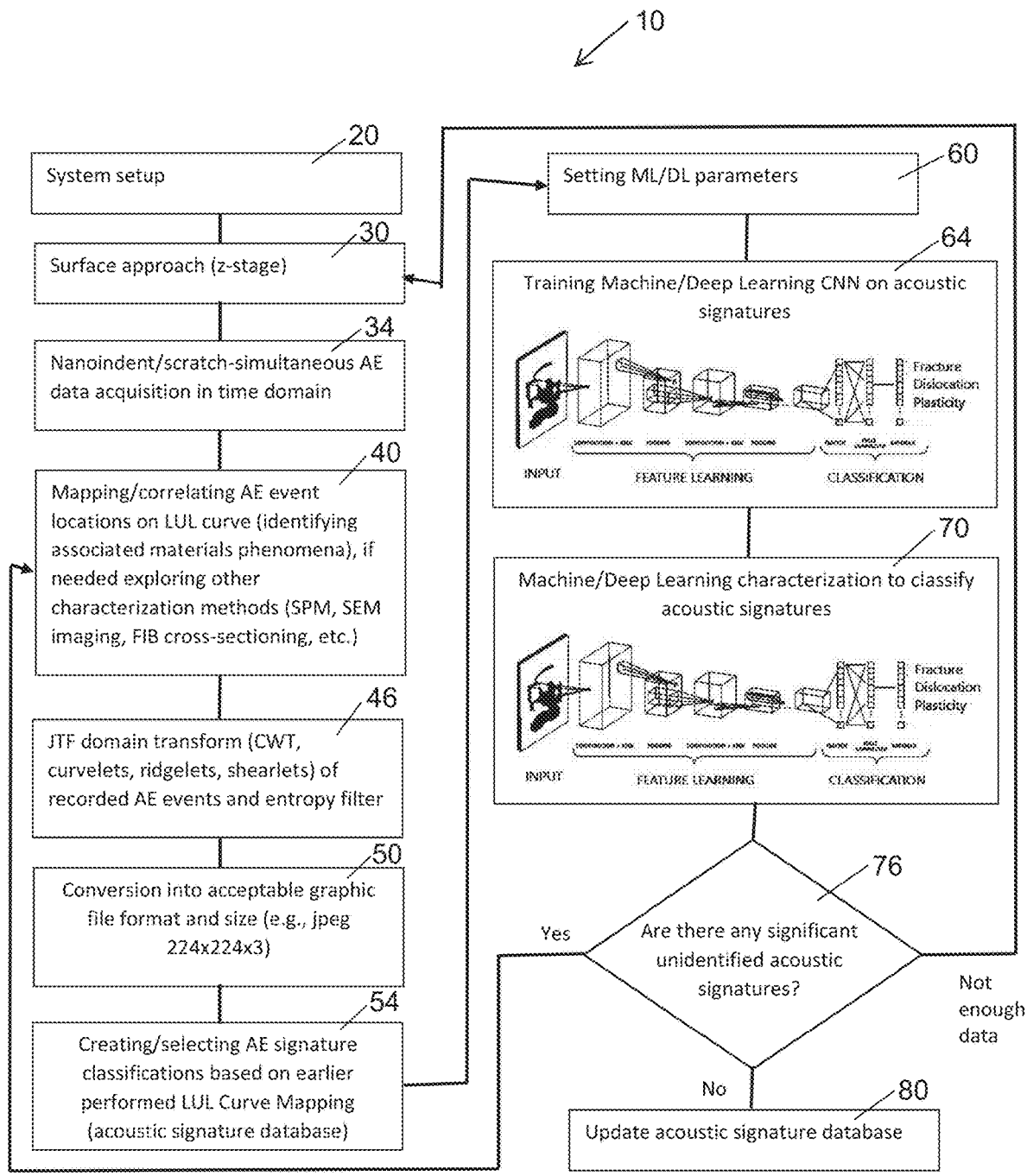
FIG. 1 is a flowchart illustrating a method in accordance with the present invention.

The following description provides detail of various embodiments of the invention, one or more examples of which are set forth below. Each of these embodiments are provided by way of explanation of the invention, and not intended to be a limitation of the invention. Further, those skilled in the art will appreciate that various modifications and variations may be made in the present invention without departing from the scope or spirit of the invention. By way of example, those skilled in the art will recognize that features illustrated or described as part of one embodiment, may be used in another embodiment to yield a still further embodiment. Thus, it is intended that the present invention also cover such modifications and variations that come within the scope of the appended claims and their equivalents.

The methodology related to nanoindentation induced AE signal characterization includes advanced signal processing such as wavelets, entropy minimization, and machine/deep learning deployment. Due to the complex structure consisting of multiple deterministic and stochastic components, passively monitored acoustic signals have to be analyzed/decomposed using techniques that have stochastic and deterministic base functions. Discrete Wavelet Transformation (DWT) and Continuous Wavelet Transformations (CWT) are utilized in describing very complex acoustic and biological systems signals. Even though DWT are computationally efficient, the CWT are preferred to provide "smooth" boundary transitions that are critical for converting Joint Time-Frequency (JTF) scattergram into a Deep Learning CNN acceptable graphic format. A Gabor's wavelet, used in generating AE signal scattergram, is constructed with a two-dimensional Gaussian window g(x,y) multiplied by sinusoidal waves propagating along K orientations {ak} 1≤k≤K as follows:

$$\phi^K(x, y) = g(x, y) \exp[-i\eta (x \cos(\alpha_k) + y \sin(\alpha_k))]$$

The Gabor's wavelet is complex. Other transforms that can be utilized in building JTF domain scattergrams are Wigner-Ville, matching pursuit, curvelets, ridgelets, or shearlets. CWT coefficient filtering can be accomplished by Shannon's entropy minimization; in the case of Gabor's wavelet, it can be expressed in the form:

$$\min(E(\phi) = \Sigma_K \phi^k \ln (\phi^k))$$

The entropy minimization for CWT coefficient sorting/filtering is implemented in sequential steps. The resulting scattergram is converted into a specified size jpeg image (e.g., 224×224×3). A simple neural network can be expressed by a multi-layer perceptron. The multi-layer perceptron λ makes predictions ỹn of the target yn via a function ỹn (xn,W) where the vector W represents all parameters of the network. Given a data set {(xn,yn)}, the overall goal is to learn the parameters W to minimize the objective:

$$\min \lambda \psi(W) + \sum_{n=1}^{N} \mathrm{loss}(y_n, \tilde{y}_n(x_n, W))$$

The regularization term ψ(W) can represent L1 or L2 norm penalties or tree regularization. A large network of multi-layered perceptrons set to achieve specialized classification tasks in unsupervised learning environment constitutes a deep learning neural network. Image recognition deep learning neural networks such as GoogLeNet, AlexNet, Caffe may be utilized for the deep learning system.

By way of example, and without limitation intended, a GoogLeNet deep learning convolutive neural network (CNN) may be utilized having 144 layers that are optimized for generic image classification/recognition and operates on 224×224×3 sized jpeg images. This deep learning network provides performance/availability criteria and may be deployed for classification of nanoindentation induced acoustic events. Mathematical formula and spreadsheet manipulation software installed on a personal computer having an operating system that executes GPUs may be used to assist the learning process. The neural network settings may include the Stochastic Gradient Descent with Momentum optimizer, the learning rate of 0.0003 per epoch, and a mini batch of 10 observations per each iteration. The GoogLeNet may be trained on predefined classifiers and then deployed on the unidentified acoustic signal data sets. Training and test data may be split at a ratio of 70/30 and then randomized for each separate run.

Figure 5:
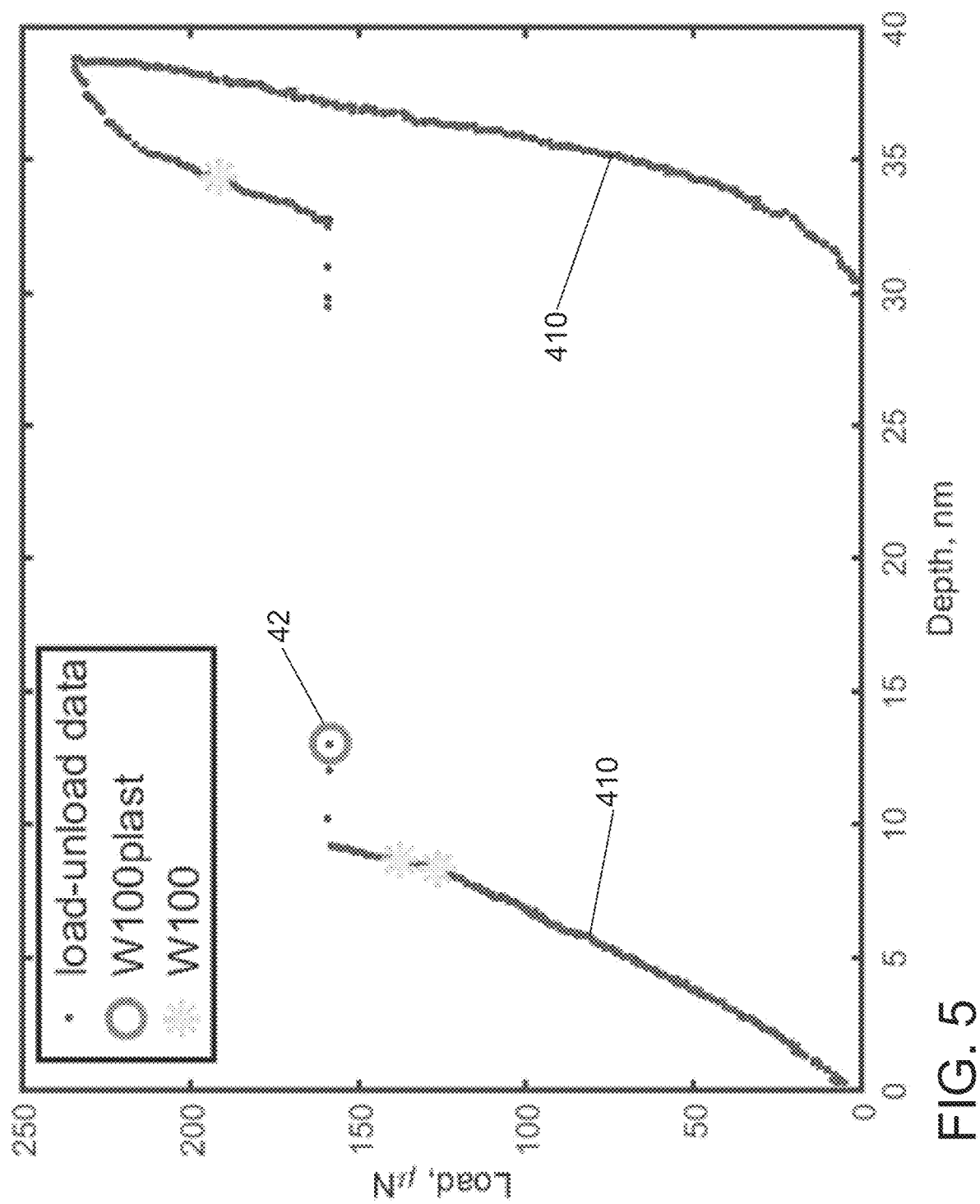
FIG. 5 is a graph illustrating a typical experimental nanoindentation load-unload curve that correlates acoustic events in accordance with an embodiment of the invention.
Figure 6:
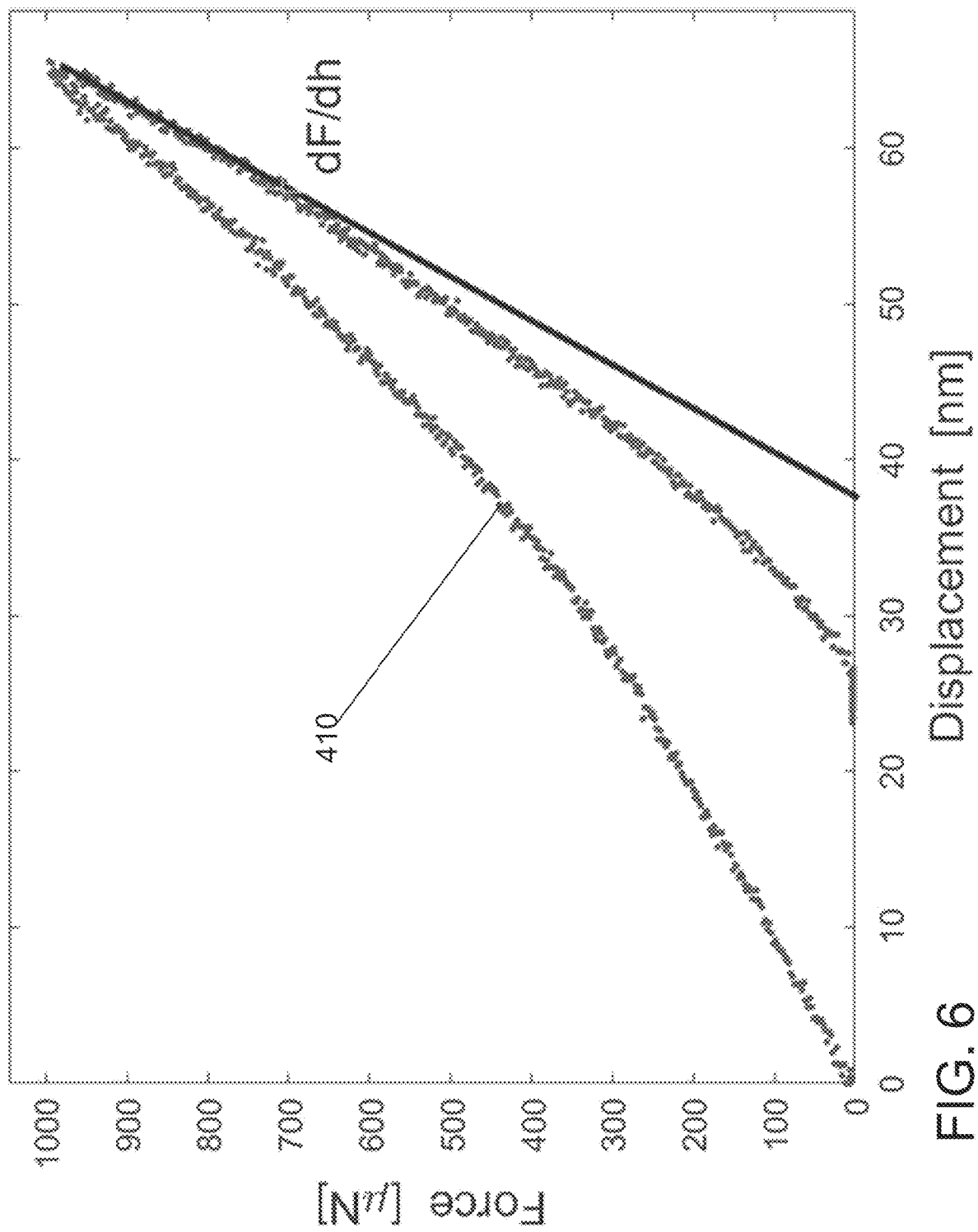
FIG. 6 is a graph illustrating an experimental load-unload curve obtained during indentation into a fused quartz sample.
Figure 7:
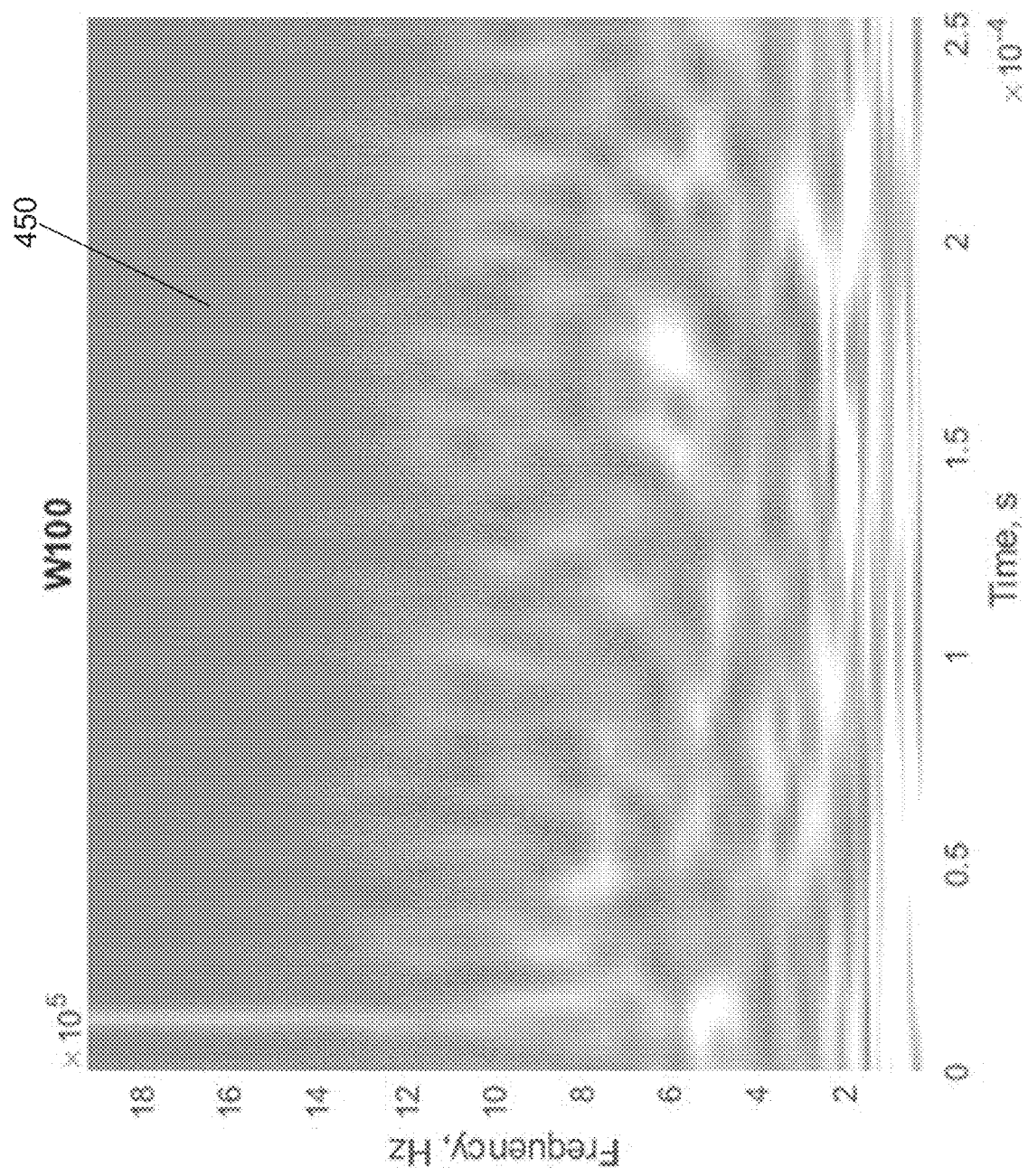
FIG. 7 is an acoustic event spectrogram that corresponds with dislocation nucleation.
Figure 8:
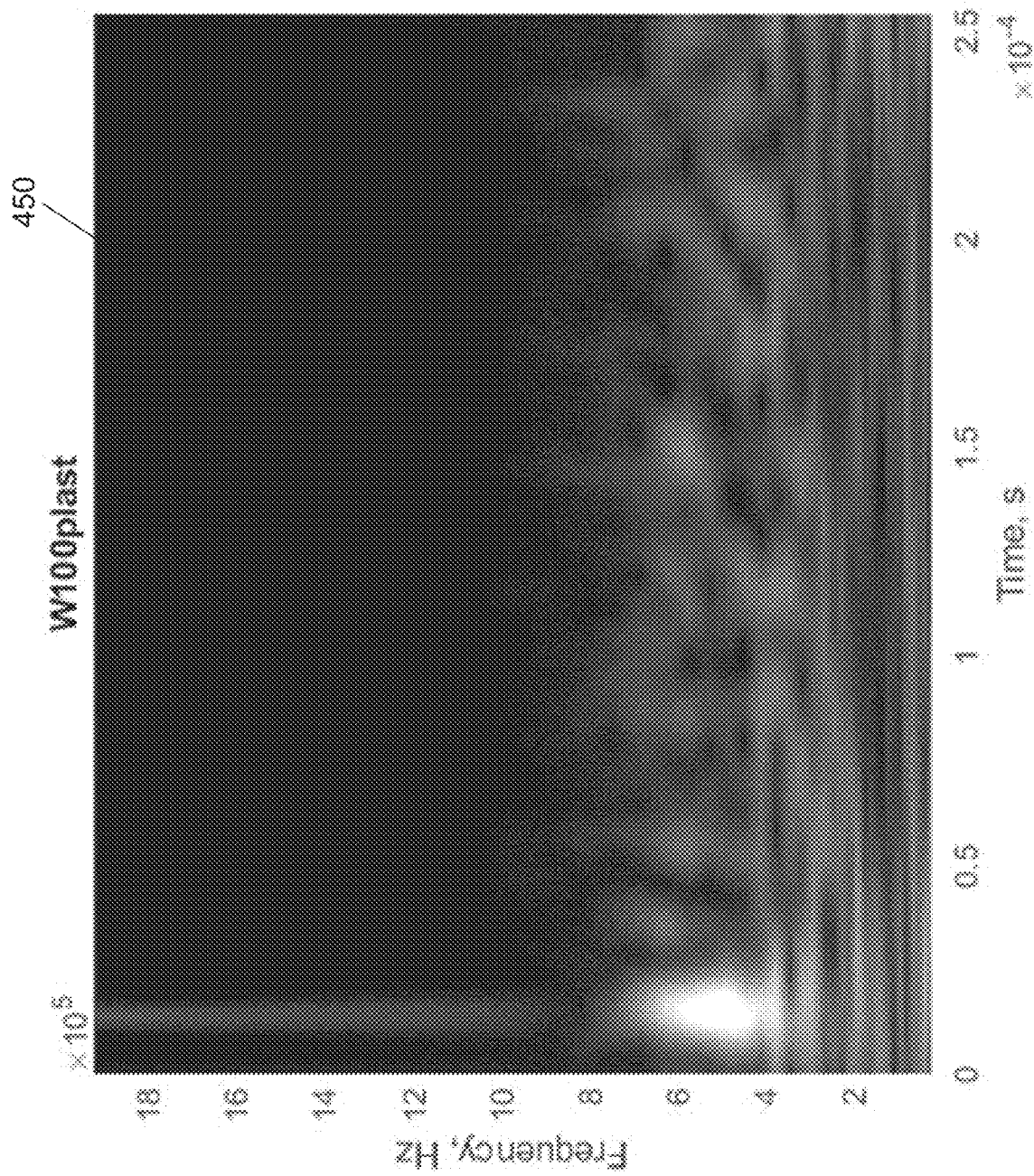
FIG. 8 is an acoustic event spectrogram that correspond with plasticity onset.
Figure 9:
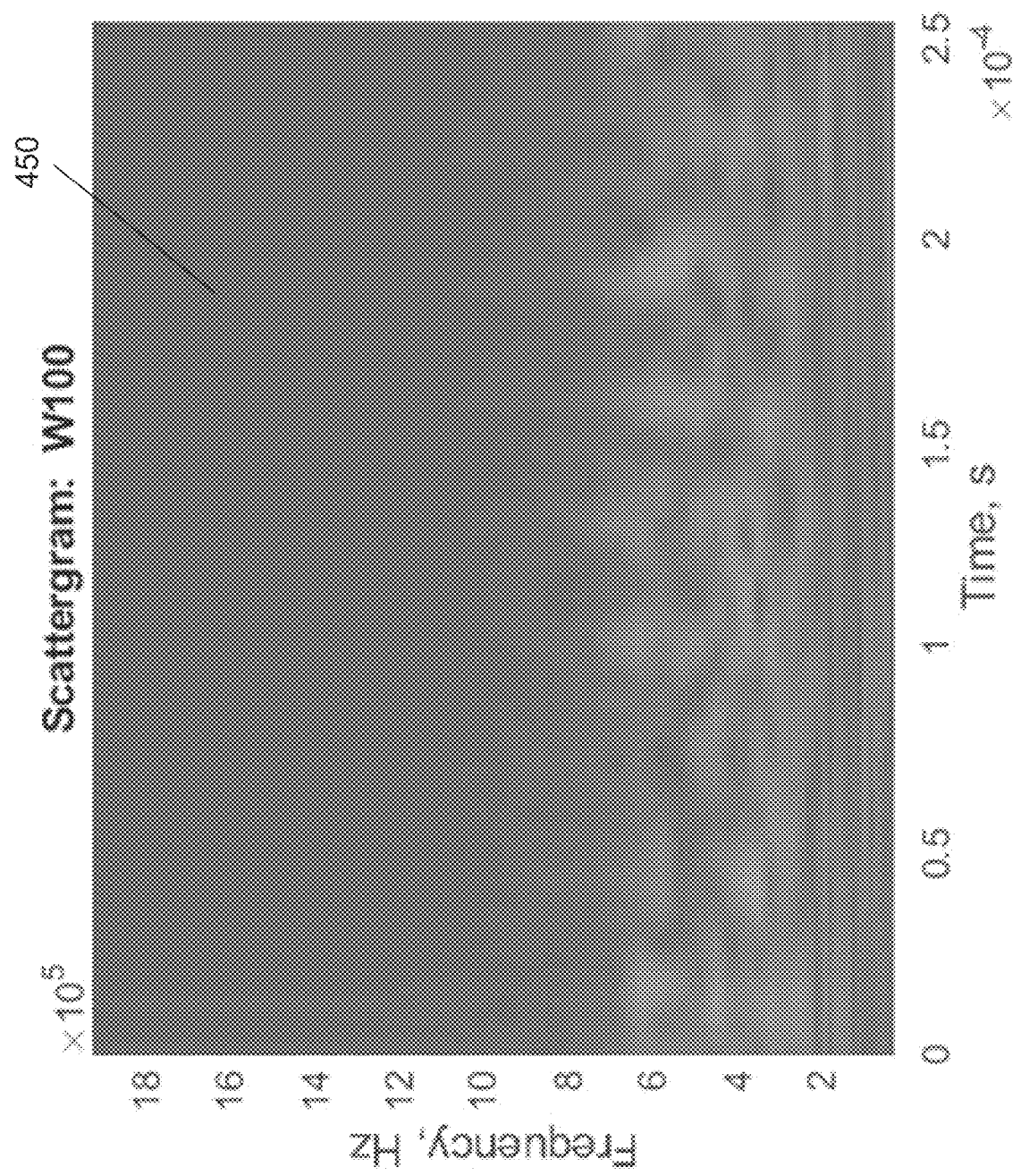
FIG. 9 is an acoustic event scattergram that corresponds with an electropolished W100 sample.
Figure 10:
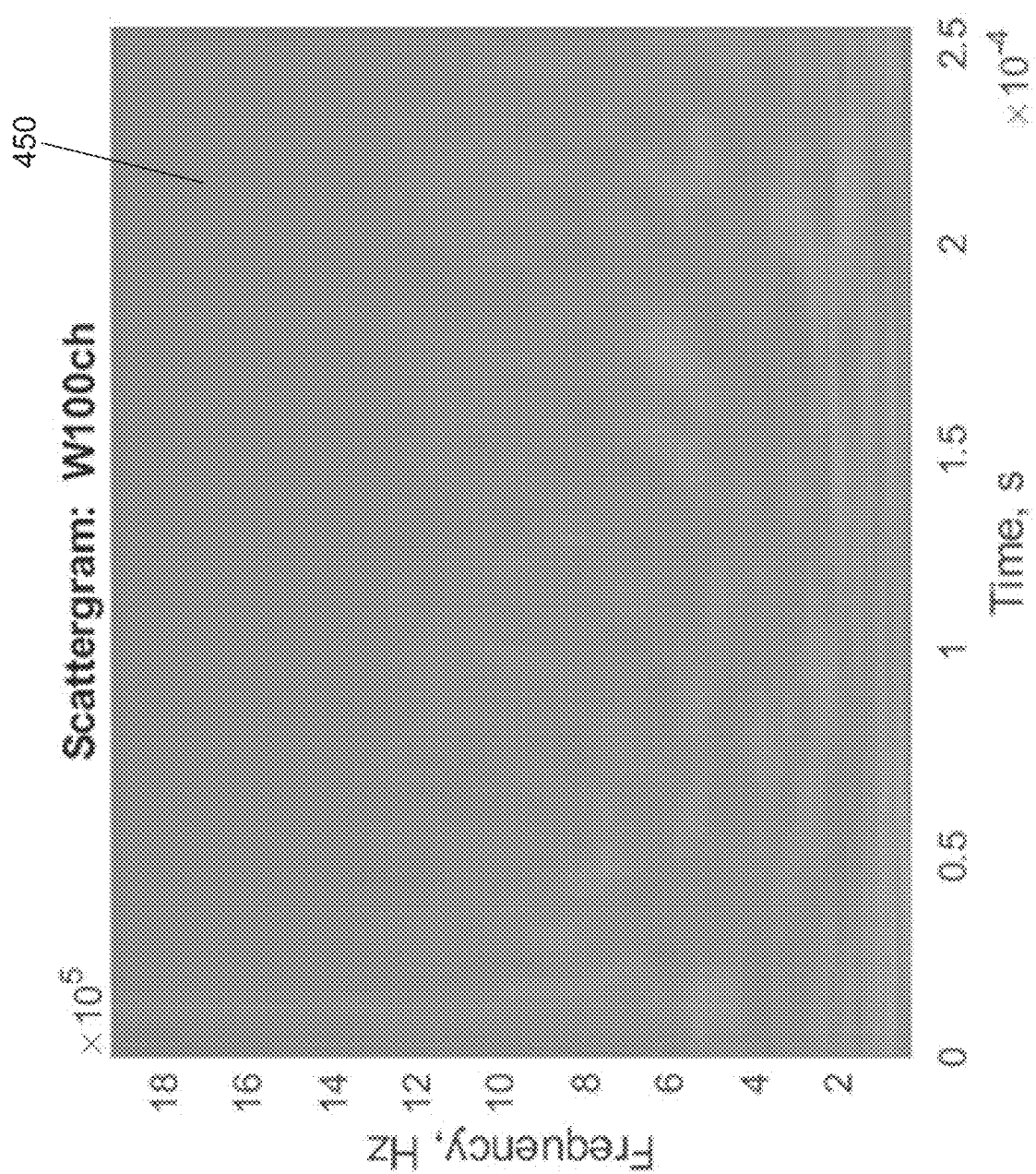
FIG. 10 is an acoustic event scattergram that corresponds with a W100ch sample.
Figure 11:
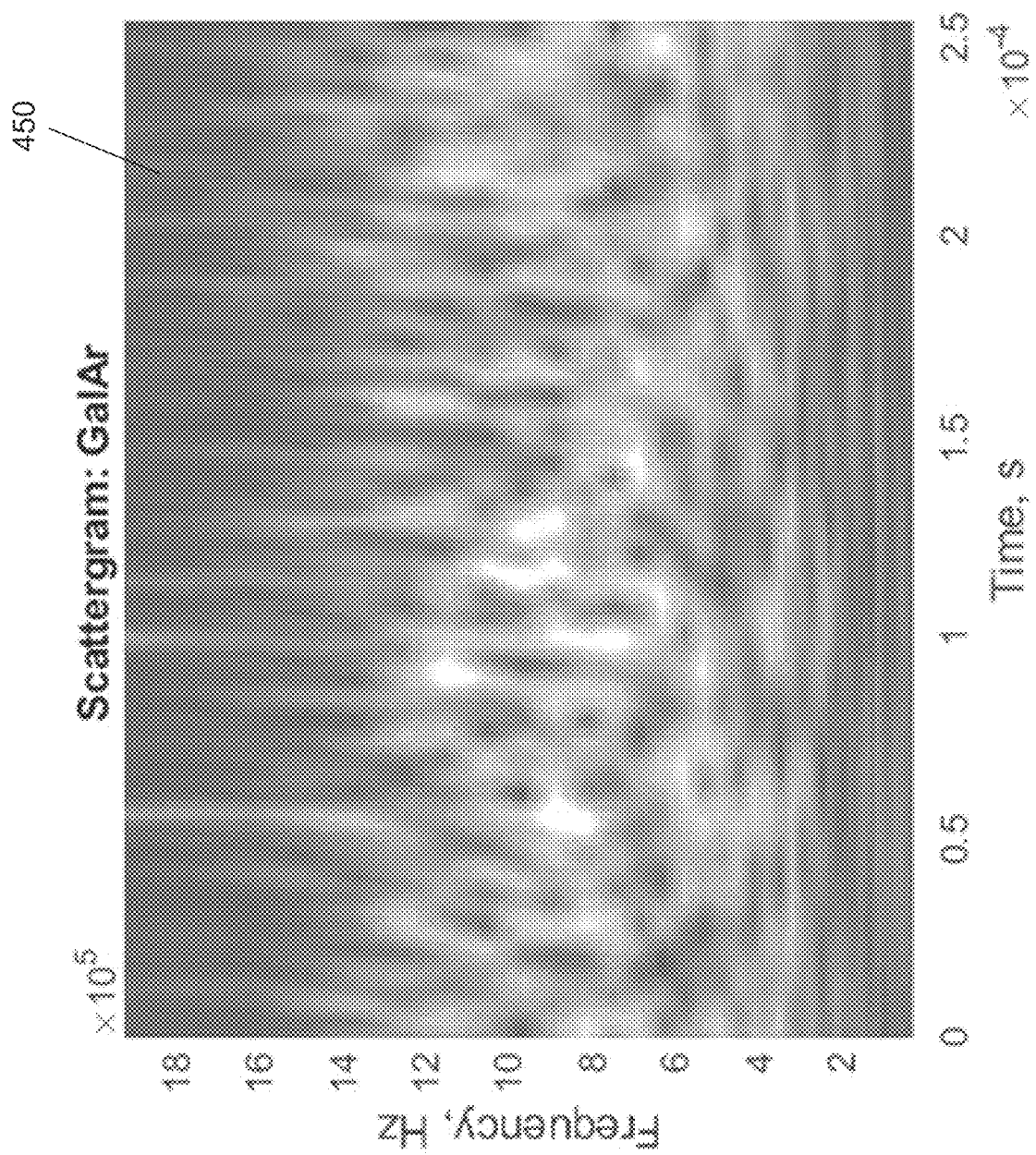
FIG. 11 is an acoustic event scattergram that corresponds with a GalAr sample.
Figure 14:
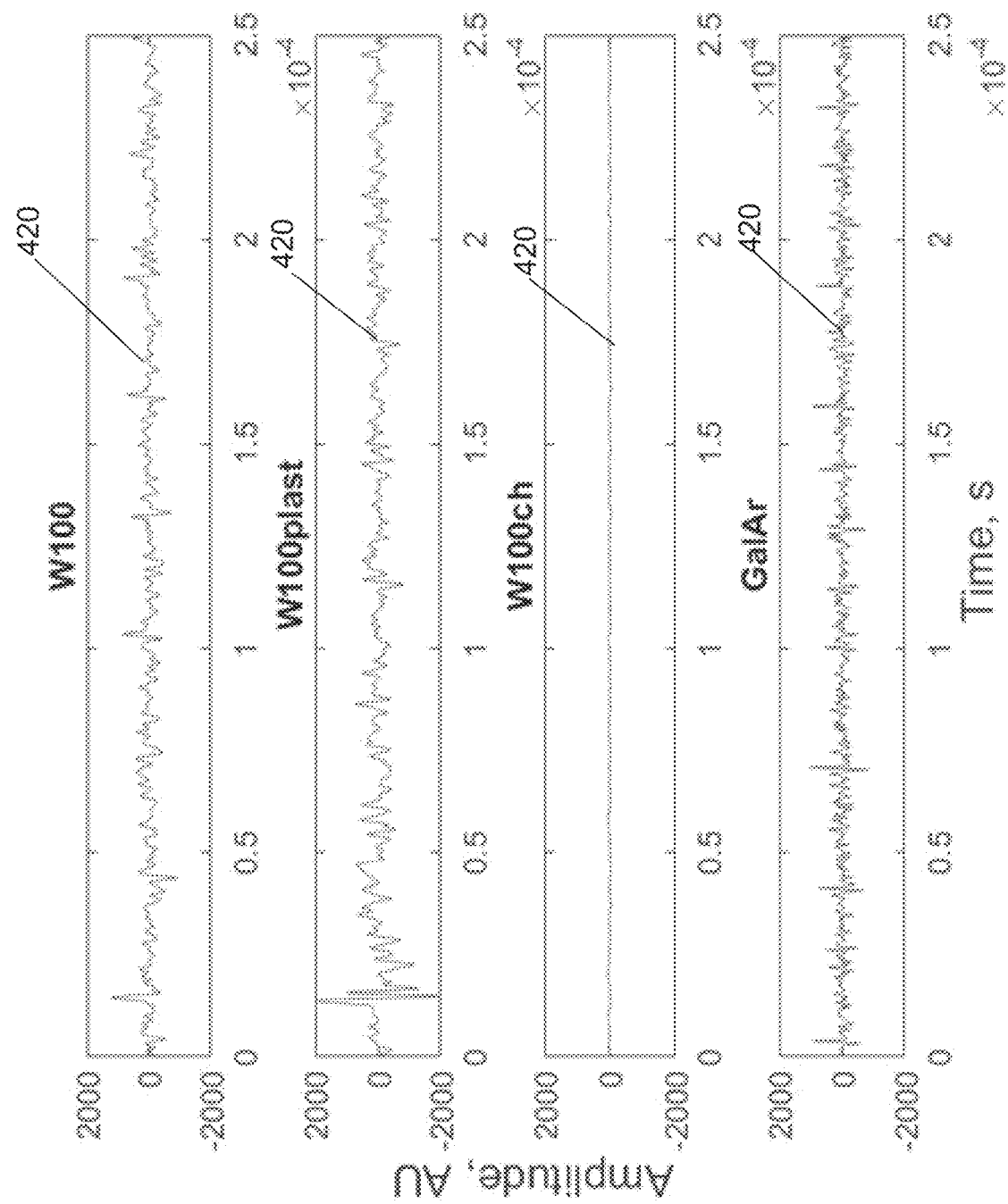
FIG. 14 is an acoustic event scattergram for four different acoustic event waveforms.

FIG. 1 illustrates the operation 10 of nanoindentation/scratch induced passive acoustic monitoring system with Machine/Deep Learning classification capability. The initial system setup 20 includes establishing the micro tool's passive acoustic signature acquisition threshold, data sampling, waveform size, and bandpass filtering corners. In addition, nanoindentation/scratch test parameters, such as quasi-static force/displacement and application time, are set. Once the system is setup, the tool may be controlled 30 so that the probe tip of the tool approaches the surface of an object. First, the distance between the diamond stylus or probe tip and the surface is found with the z-stage control. The probe tip is then shifted laterally by a small amount. Acoustic monitoring response is tested at this point. The next step 34 is an actual nanoindent/scratch test that starts at the first surface location while simultaneously monitoring acoustic events. The next step 40 is to associate the recorded AE events 42 (FIG. 14 illustrates acoustic emission waveforms) with locations on the LUL curve 410. This may be initially performed by a user to classify events. In the case of nanoindentation (depending on the sample) plasticity onset, dislocations, twinning, contact adhesion, and different modes of fracture induced events may be classified. A typical experimental nanoindentation LUL curve 410 obtained by indenting into W(100) with correlated AE events 42 is shown in FIGS. 5-6. It has been observed that an AE event 42 on the large excursion is associated with a plasticity onset "W100plast", while others events 42 on the loading curve are due to dislocations "W100". Stick-slick behavior, brittle, ductile fracture, and thin film breakthrough can be identified from nanoscratch tests. In addition, a full characterization can involve other methods such as in-situ SPM imaging, FIB SEM cross-section images, and chemical analysis. This step may be user controlled to establish initial classification of AE signatures. The JTF domain transform step 46 converts time domain acoustic signatures into JTF domain spectrograms. FIGS. 7-11 illustrate various AE scattergrams that correspond to dislocation, nucleation, and plasticity onset.

The next step 50 converts JTF scattergrams into acceptable graphical format images to prepare data for the dedicated ML/Deep Learning characterization step. The ML/Deep learning creation/selection step 54 performs image recognition of recorded AE signatures and classifies them according to the classifications established by the operator. Here, unknown signatures undergo the operator's review on whether to be added into a new category.

Figure 12:
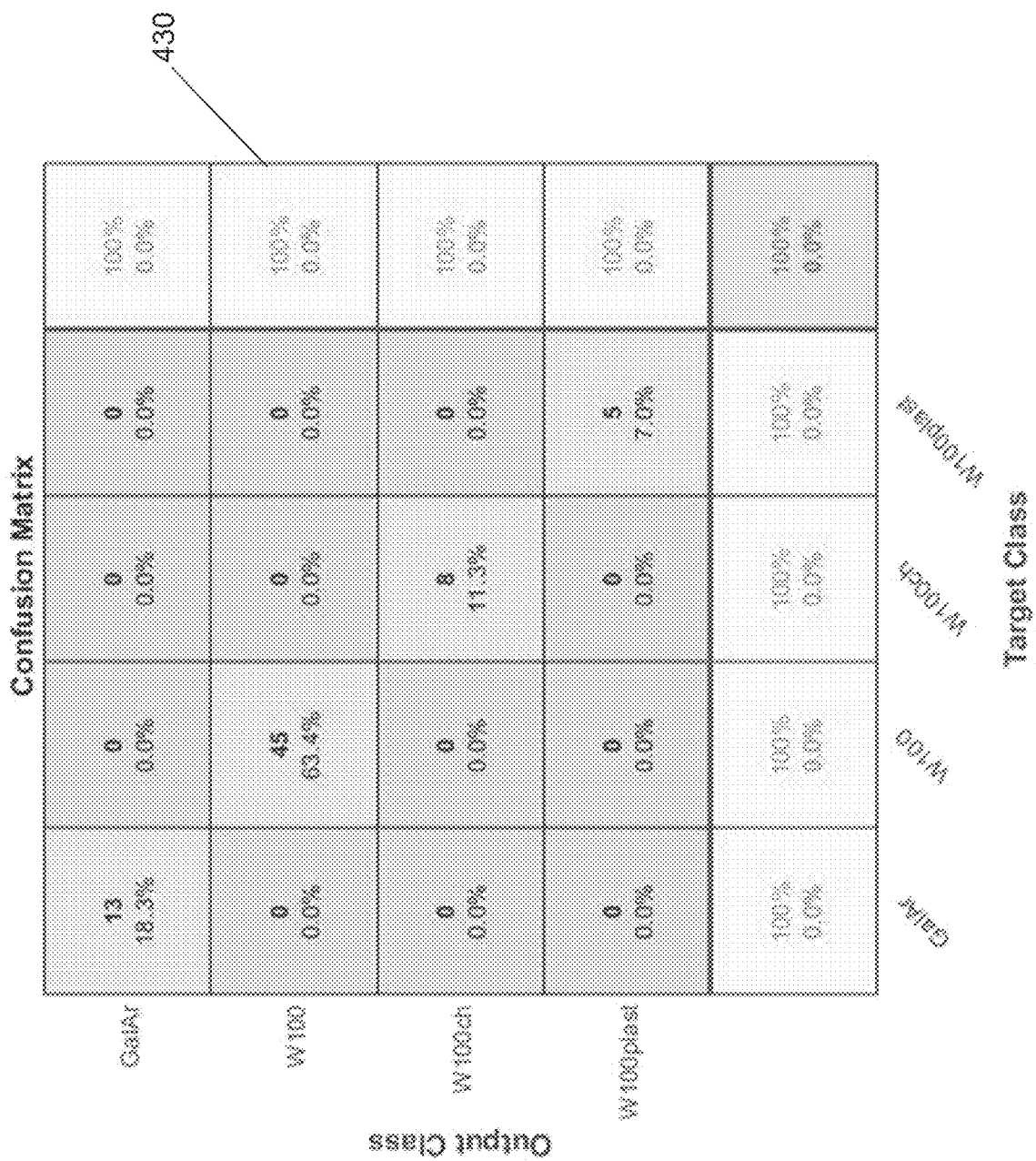
FIG. 12 is an illustration of a neural network training confusion matrix.
Figure 13:
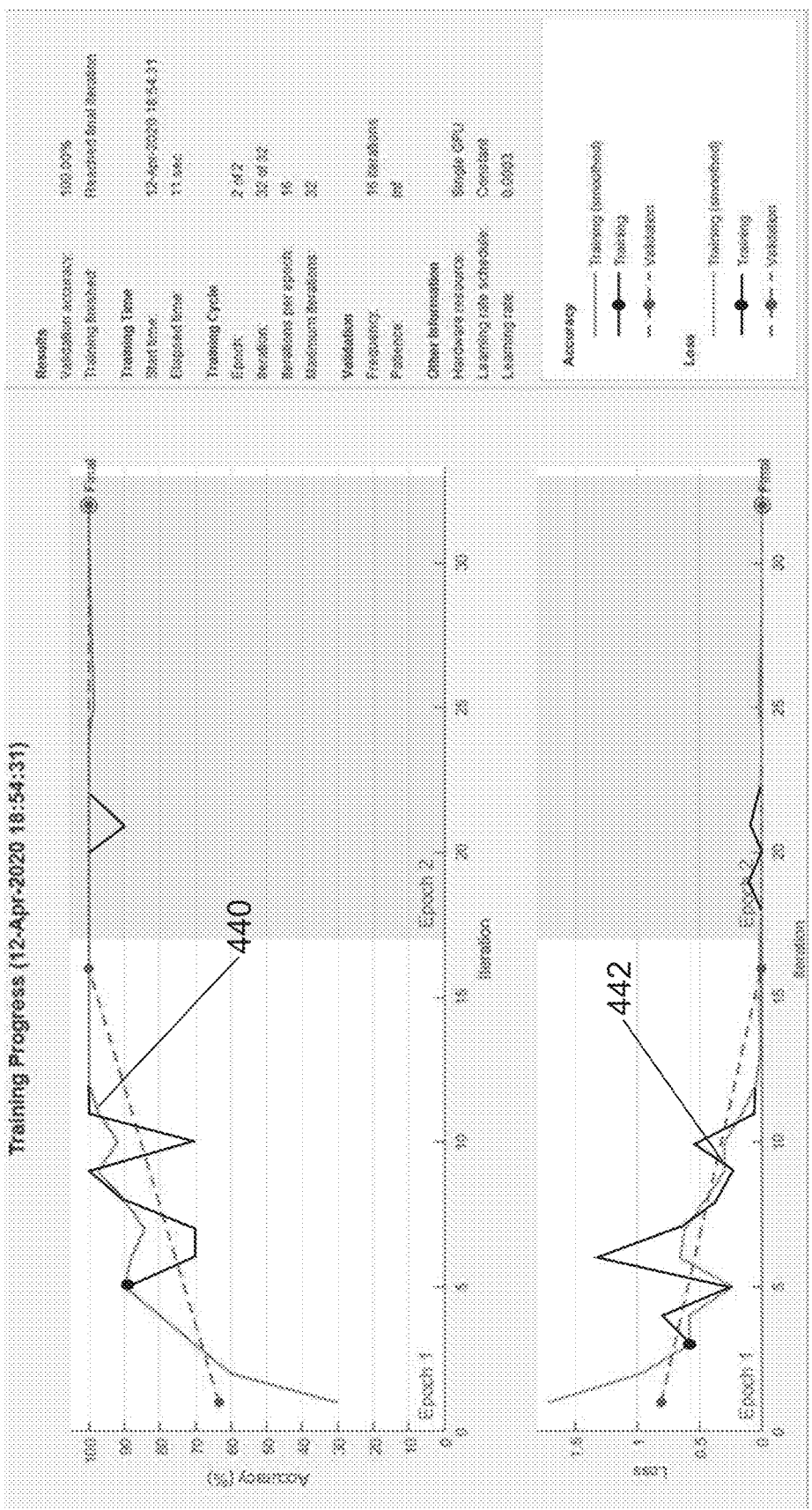
FIG. 13 is an illustration of the typical dynamics of a deep learning process conducted on several hundred passive acoustic images.
Figure 15:
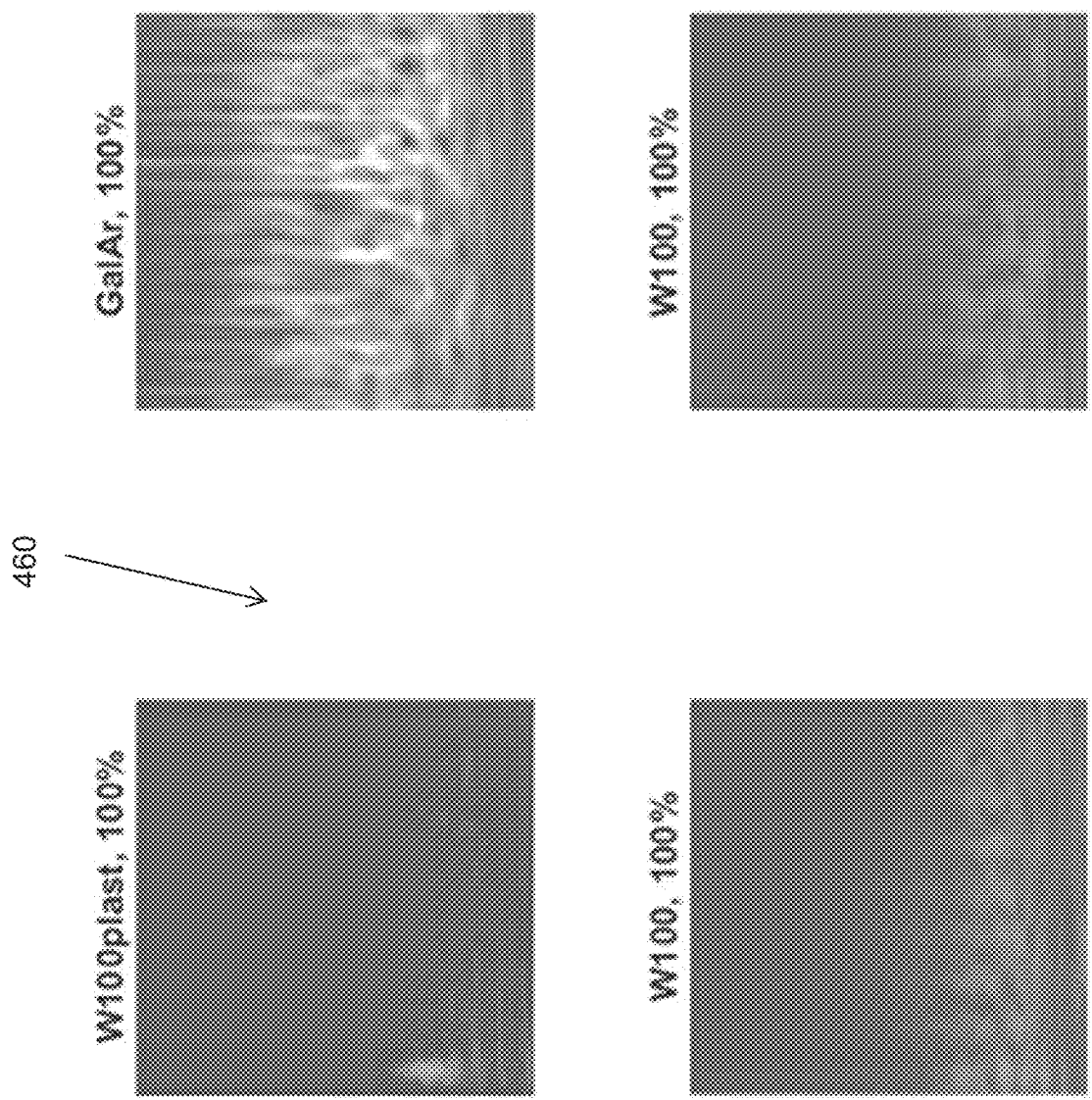
FIG. 15 are images of four spectrograms of trained acoustic signature images that were correctly identified.

The setting of the ML/DL parameters step 60 involves choosing a number of images to train, set the learning rate, set the number of epochs and iterations, and to choose the optimization algorithm for training. The typical dynamics of the Deep Learning process conducted on several hundred passive acoustic image is shown in FIG. 13, where accuracy 440 and losses 442 are plotted against number of iterations. The training step 64 is completed when accuracy of 100% is reached consistently for several iterations. FIG. 12 illustrates a confusion matrix 430 that may demonstrate when an accuracy of 100% is reached. After training is complete, the system is ready for the step of learning and classification 70 of acoustic signatures. Four randomly selected non-trained spectrogram or acoustic signature images 460 are identified with 100% confidence as shown in FIG. 15. A decision is made at 76 whether there are significant unidentified acoustic events or signatures. If there are a significant number then steps 40 through 70 are repeated. If there's insufficient data then steps 30 through 70 are repeated. Once there is no longer significant unidentified acoustic events, the acoustic signature database is updated at step 80.

Figure 2:
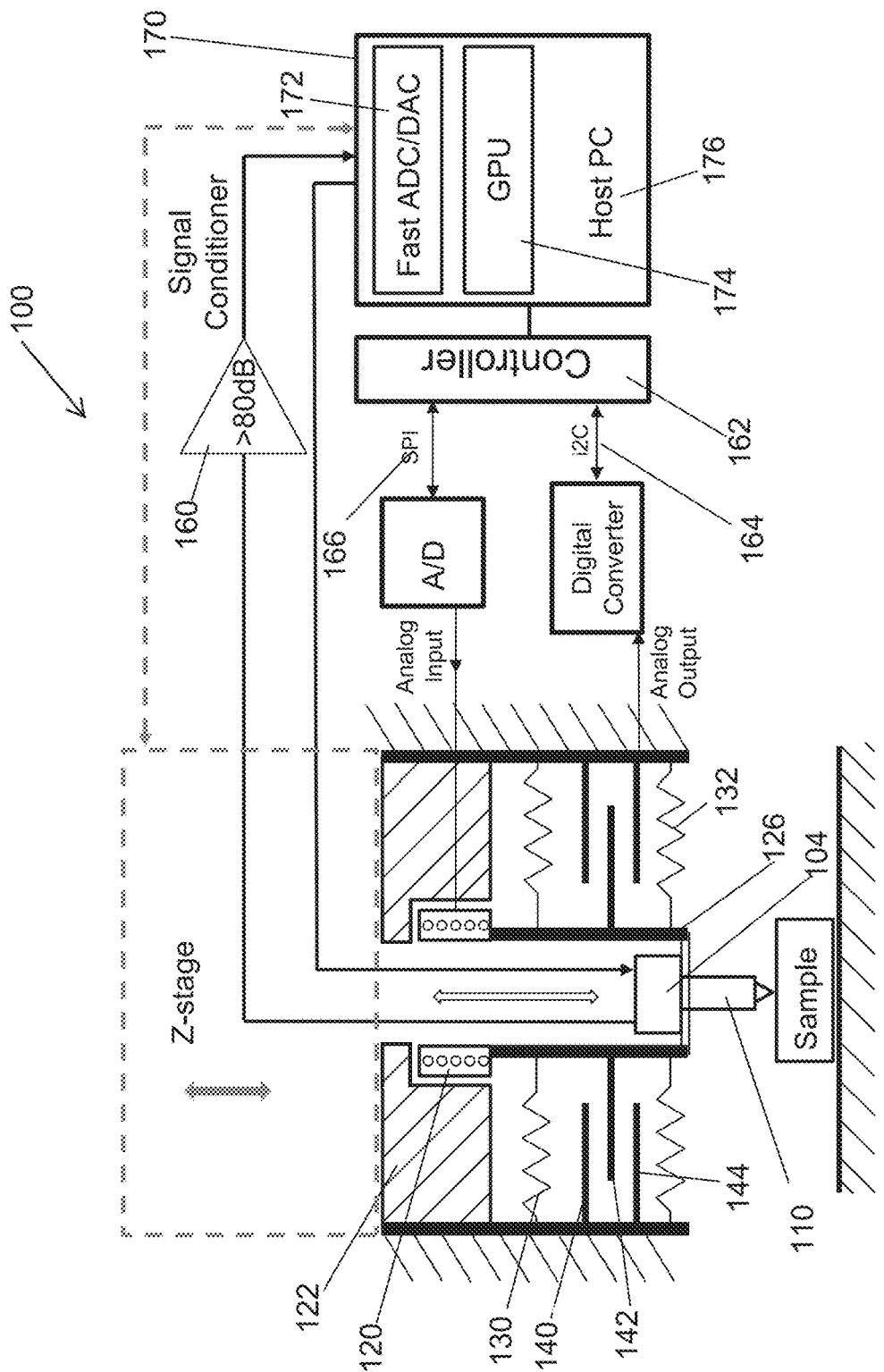
FIG. 2 is a block diagram representation of a nanomechanical instrument having in-situ acoustic event monitoring and acoustic event classification capability in accordance with the present invention.

The nanomechanical test instrument 100 with in-situ AE monitoring capability is depicted schematically in FIG. 2. The instrument has a voice coil 120 and permanent magnet 122 driven indenter shaft 126 where the acoustic sensor 104 is installed together with the ultrasonic nanoindentation tip 110. The shaft 126 is suspended on low stiffness (~100 N/m) flat springs 130 and 132. A vertical displacement of the tip 110 is measured by a three-plate capacitor 140, 142 and 144 where the center plate 142 is rigidly attached on the shaft 126, and the outer plates 140 and 144 are installed on the frame or casing 150. Signals from the acoustic sensor 104 pass through a signal conditioner 160 to processor 170. Processor 170 includes a fast ADC/DAC 172, a GPU 174 and a host pc 176. A differential output signal between the central and outer capacitance plates 140-144 is processed by specialized ADC 172, which is operated by controller 162 via i2c interface 164. The controller 162 operates specialized DAC 172 via SPI interface 166 that outputs current for the voice coil actuator 120. The host PC 176 manages all digital controller commands, and controls XYZ stage. The nanomechanical instrument 100 is calibrated according to the ISO14577 standard for instrumented nanoindentation. Displacement and force noise floors of the instrument are 1 nm and 1 µN, respectively. Maximum force and displacement are 300 mN and 250 µm.

The passive acoustic monitoring system consists of the ultrasonic nanoindentation tip 110, signal conditioner 160 and fast ADC/DAC 172 which is synchronized with the nanoindenter controller 162. The ultrasonic nanoindentation tip 110 registers AE events during nanoindentation. During testing, it is operated in the passive pickup mode while an active mode is used for initial calibration. The signal conditioner amplifies the AE signal by ~80 dB and has 100 kHz to 2 MHz bandpass filter. Data is acquired by the fast ADC/DAC 172 which has an 8 MHz sampling rate and 16-bit resolution.

Typical nanoindentation load-unload curves on W (100) with correlated AE events is shown in FIGS. 5-6. Here, the large excursion on the load segment indicated a plasticity onset marked by "W100plast" label. The other types of AE events were triggered during the same nanoindentation process as well and were marked as "W100". The AE signals acquired by an extra AE sensor attached to the sample were indicated by "W100 ch". In this case, the AE sensor (Micro 80, Physical Acoustics Co., USA) was connected to the ADC/DAC board via signal conditioner capable of 80 dB amplification.

The "W100" and "W100 ch" events located below the yield point were likely due to dislocation nucleation and/or oxide fracture. Also, "W100" and "W100 ch" events found at the end of unloading segment were potentially due to the tip pull-off. There is no explanation on the nature of "W100" and "W100 ch" AE events found on the unload segment between loads of 750 µN and 45 µN. In addition, 150 nm thick GaAr coated Si wafer samples were used to generate AE signatures on a different than W (100) material for comparison purposes and were labeled by "GalAr". A total of 245 AE signals were obtained during 50 AE monitored nanoindentation tests. A diamond 40 nm radius cube corner tip was used. All four types of typical AE signals are plotted in FIGS. 17 and 18 where differences in waveform shapes can be observed. As previously described, these visual differences do not always translate into statistically defined characterization values. For example, waveform RMS ANOVA comparison of the data revealed that types "W100" and "GalAr" were statistically indistinguishable. Utilizing methods in accordance with the present invention, all AE waveforms were decomposed using CWT and the resulting coefficients sorted by the entropy minimization routine. The resulting JTF scattergrams 450 were converted into 224× 224×3 sized jpeg images. The scattergrams for all four types of waveforms shown in FIGS. 7-11 indicate that every type of AE event has characteristic topographic features.

Figure 3:
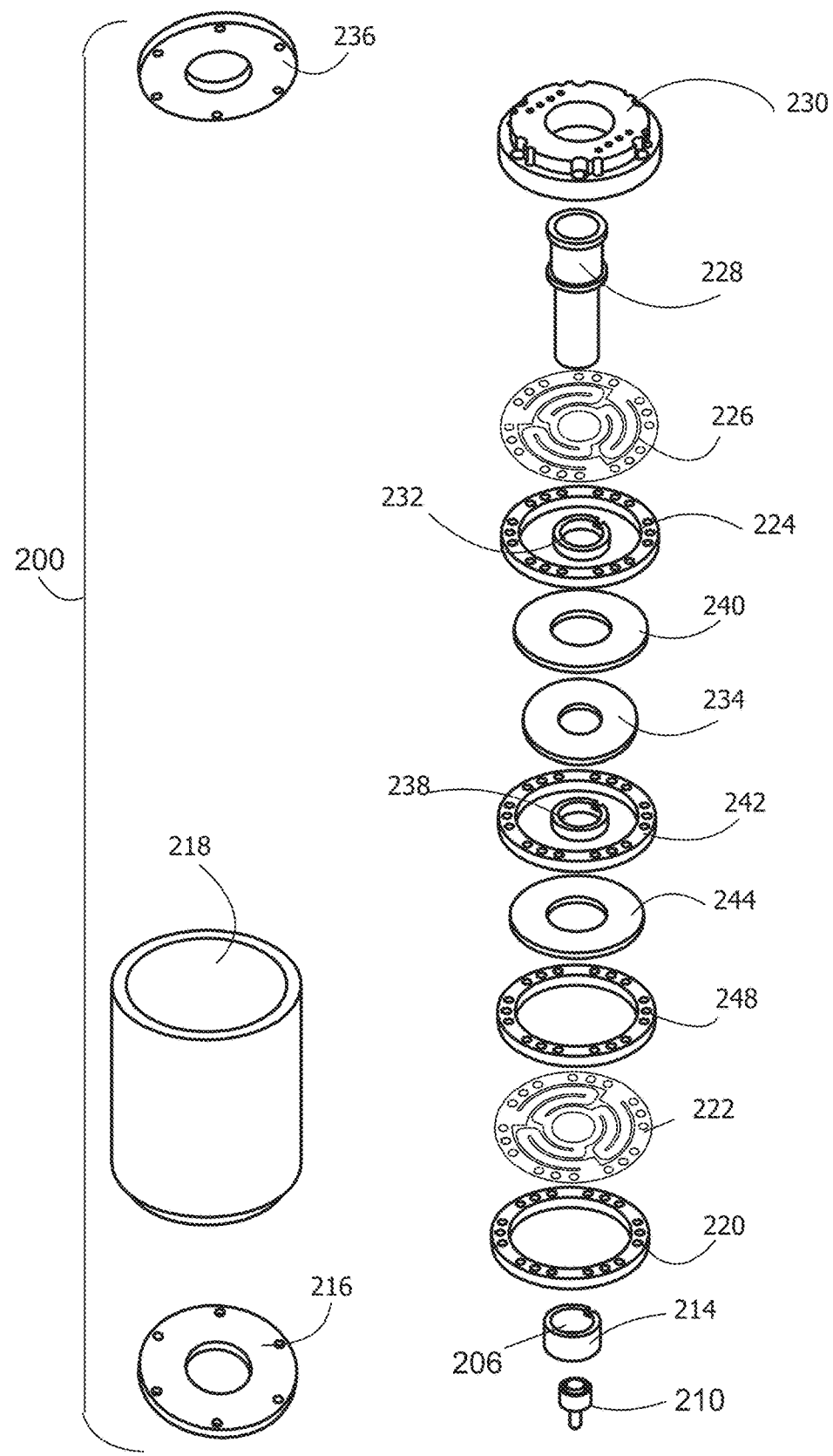
FIG. 3 is an exploded perspective view of a tip in accordance with an embodiment of the invention adapted to a probe of a micro tool in accordance with the invention.
Figure 4:
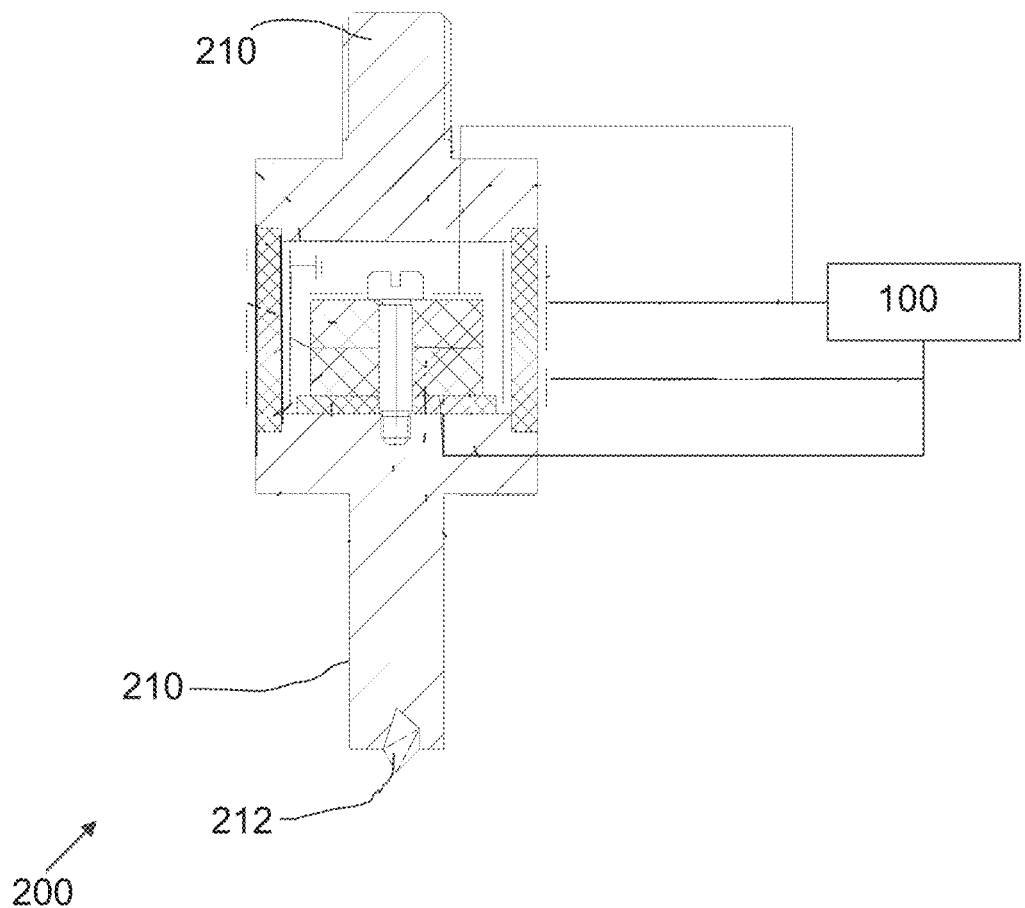
FIG. 4 is a partial sectional perspective view of an alternative Ultrasonic tip suitable for use with the present invention.

Turning attention now to FIGS. 3-4, embodiments of the probe tip will now be described in more detail. The micro tool includes an ultrasonic multimode probe tip component 210 coupled to a probe holder 200 of the invention. The probe tip 210 of known suitable construction includes an elongated column or waveguide fixed to a shaft or holder 228 having an integrated voice coil. The holder 228 is at least partially contained within cylindrical frame or casing 218. A bottom cover 216 contains the shaft 228 within the casing 218. Probe 210 is held in place by securing ring 214. An acoustic sensor 206 may be positioned within the securing ring 214 or made integral with probe 210. Support ring or space 220, first planar spring 222, securing ring 224, and second planar spring 226 are sandwiched within the casing 218 between an inner flange of the casing and top cover 236. The planar springs 222 and 226 may be constructed of, for example, a shape memory alloy such as a NiTi alloy and the springs are engaged to the holder 228. Alternatively, for example, the springs may be made from other alloys having a thin film piezo layer deposited on a planar surface of the spring. When electricity is applied to the shape memory alloy or piezo film, portions of the spring will bend to a preset position. In this manner the springs may be utilized to move the probe tip to a desired position. The probe tip illustrated in FIG. 4 is more fully described in U.S. Pat. No. 9,753,016 the details of which are incorporated herein for all purposes.

The probe holder 200 includes shaft 228 with an integrated voice coil that is mounted on two sets of flat springs ensuring low stiffness of ~100 N/m. The upper spring 226 is secured with the ring 224. A center capacitance plate 234 is mounted on the shaft 228 and secured with rings 232 and 238. The lower spring 222 is mounted on the shaft 228 and is secured by the ring 214 and spacers 248, 220. The ultrasonic tip 210 is mounted onto the end of the shaft 228. The voice coil with shaft 228 is driven by the permanent magnet assembly 230 where outer diameter of the top flat spring 226 rests on. The spring 226 is secured by the spacer 224. The outer top capacitive electrode 240 is resting on the spacer 224 and is supported by the spacer 242. The bottom capacitive electrode 244 is resting on the spacer 242 and is supported by the spacer 248. The bottom flat spring 222 is resting on the spacer 248 and is secured by the spacer 220. The assembly is mounted inside of the cylindrical frame 218 and secured by the bottom plate 216. It is all secured from the top by the dedicated cover plate 236. The spacer 242 ensures the spacing/gap needed by the center 234, top 240, and the bottom 244 capacitance plates to perform differential measurement. The differential capacitance measurement can be formalized by the following expression:

$$I_{out} = V_I \overline{\omega}(C_1 - C_2) = 8.854 * 10^{-12} * V_I \overline{\omega} A \frac{2x}{d^2}$$

Here, the output current Iout is measured on the differential capacitance channels of C1 and C2. A is a capacitive electrode area, x—is the moving distance of the shaft, and d is the fixed distance between plates. $\overline{\omega}$ is a cyclic frequency while VI is applied voltage. Differential capacitance is measured by the precision ADC, which converts analog capacitance measurements into digital values. The obtained digital values are calibrated for force and displacement according to the ISO 14577 standard. The quasi-static force is generated by applying controlled voltage via the Digital Converter onto a voice coil mounted on the shaft 228 and permanent magnet 230 installed on the rigid assembly.

Figure 16:
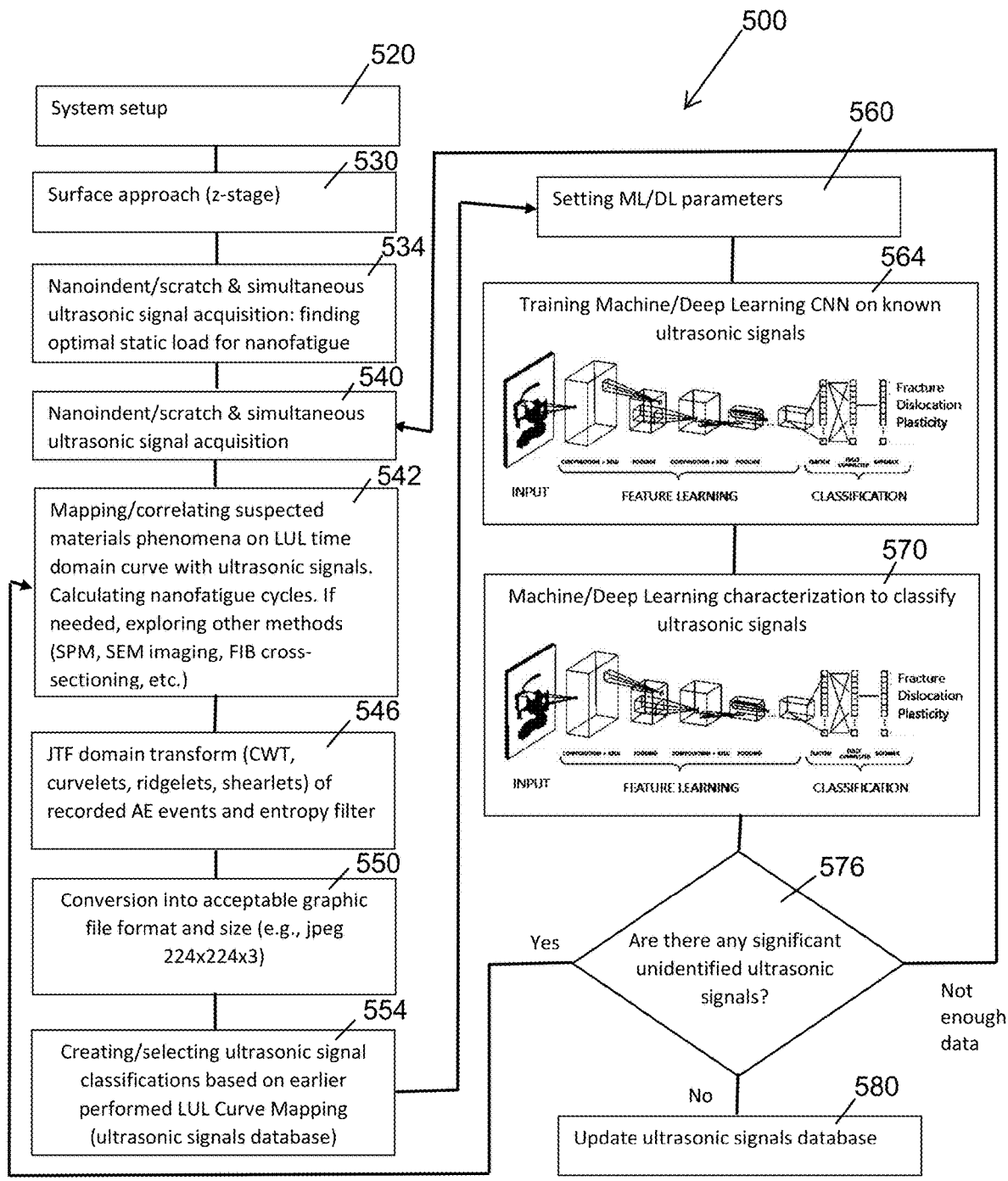
FIG. 16 is a flowchart illustrating a method in accordance with the present invention.
Figure 17:
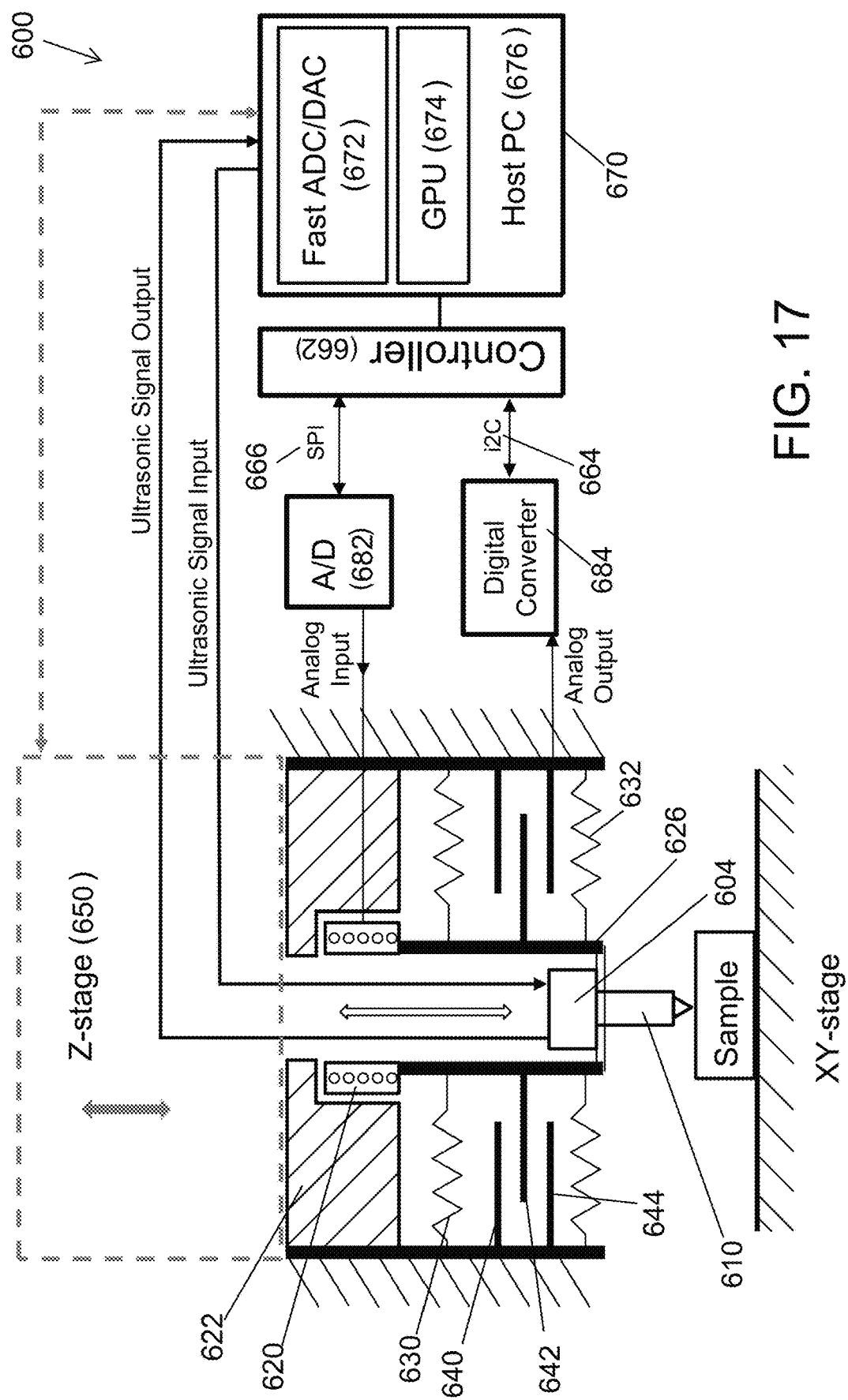
FIG. 17 is a block diagram representation of a nanomechanical instrument having in-situ event monitoring and ultrasonic event classification capability in accordance with the present invention.
Figure 18:
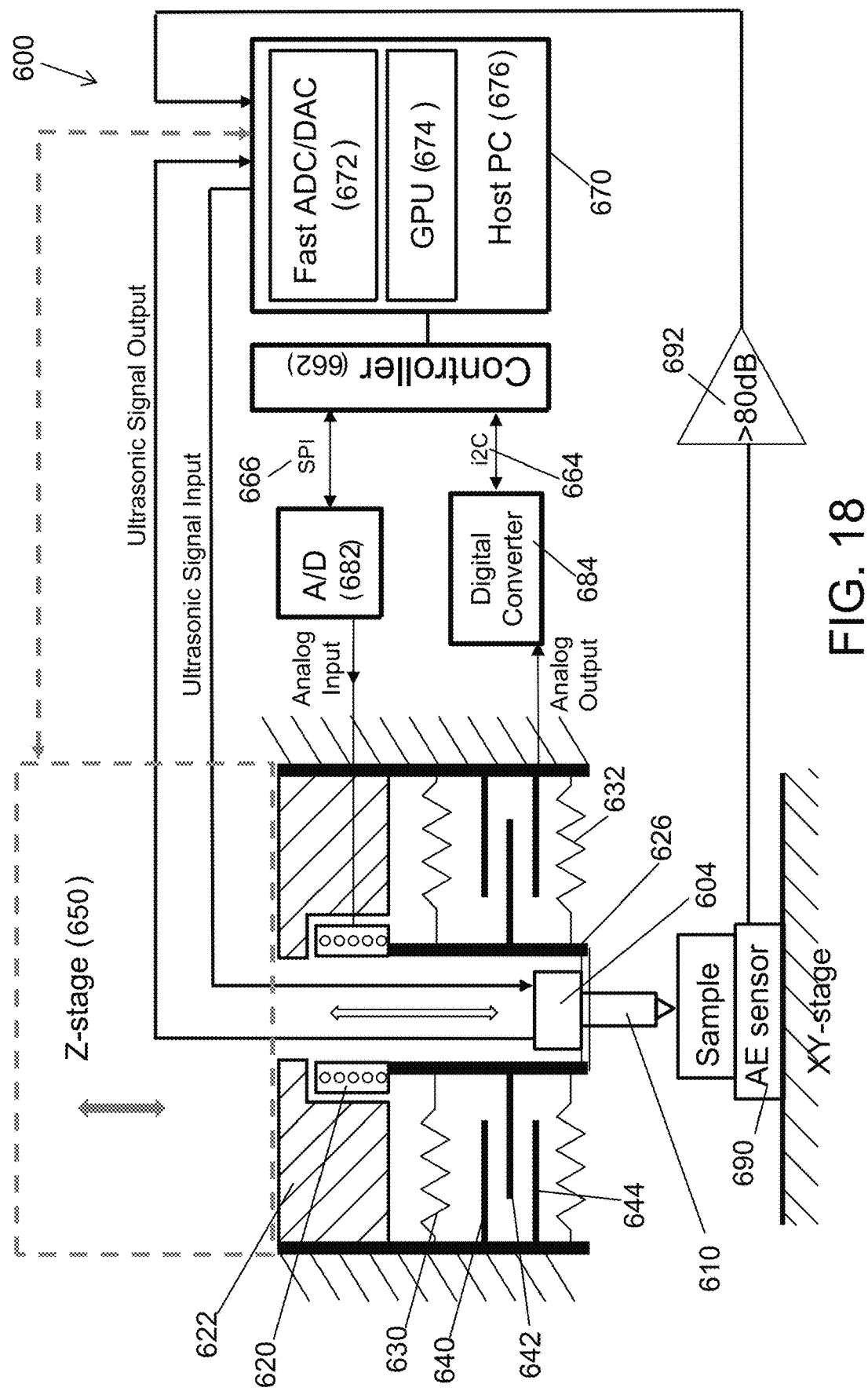
FIG. 18 is a block diagram representation of a nanomechanical instrument having in-situ event monitoring, in-situ acoustic event monitoring, and event classification capability in accordance with the present invention.

FIGS. 16 through 22 illustrate other embodiments according to aspects of the invention. The newly developed nanomechanical test instrument 600 with in-situ ultrasonic monitoring 542, and Machine/Deep Learning ultrasonic signal classification capability 570 is depicted schematically in FIGS. 16, 17, and 18. FIGS. 17 and 18 illustrate mechanical assemblies of the nanomechanical test instrument 600 with an integrated ultrasonic tip 610 and ultrasonic sensor 604 for ultrasonic monitoring.

The nanomechanical test instrument 600 with active nanofatigue monitoring capability is depicted schematically in FIG. 17. The instrument has a voice coil 620 and permanent magnet 622 driven indenter shaft 626 where the ultrasonic signal sensor 604 is installed together with the ultrasonic nanoindentation tip 610. The shaft 626 is suspended on low stiffness (~100 N/m) flat springs 630 and 632. A vertical displacement of the tip 610 is measured by a three-plate capacitor 640, 642 and 644 where the center plate 642 is rigidly attached on the shaft 626, and the outer plates 640 and 644 are installed on the frame or casing 650. Signals from the ultrasonic waveform sensor 604 transmit to processor 670. Processor 670 includes a fast ADC/DAC 672, a GPU 674 and a host pc 676. A differential output signal between the central and outer capacitance plates 640-644 is processed by specialized ADC 672, which is operated by controller 662 via i2c interface 664 and digital converter 684 to convert an analog output transmitted from the capacitance plates. The controller 162 operates specialized DAC 172 via A/D converter 682 and SPI interface 666 that outputs current for the voice coil actuator 620. The host PC 676 manages all digital controller commands, and controls XYZ stage. The nanomechanical instrument 600 is calibrated according to the ISO14577 standard for instrumented nanoindentation. Displacement and force noise floors of the instrument are 1 nm and 1 µN, respectively. Maximum force and displacement are 300 mN and 250 µm, respectively. The nanomechanical test instrument is placed on a high stiffness Z-stage 650. A sample is positioned laterally by the XY-stage.

The active ultrasonic waveform monitoring system consists of the ultrasonic nanoindentation tip 610 and fast ADC/DAC 672 which is synchronized with the nanoindenter controller 662. The oscillating ultrasonic nanoindentation tip 610 generates ultrasonic waves and registers returning ultrasonic pulses during the nanoindentation/ scratch test. The data is acquired by a fast ADC/DAC which has 4-8 MHz sampling rate and at least 16-bit resolution and 100 kHz to 2 MHz bandpass filter.

FIG. 18 illustrates the nanomechanical test instrument 600 having an additional acoustic emission sensor 690 spaced apart and aligned with probe tip 610. The acoustic emission sensors 690 acts as a sample holder. In this arrangement the ultrasonic wave generated by the ultrasonic nanoindentation tip is transmitted through the sample and is detected by the acoustic emission sensor. The detected signal is transmitted through signal conditioner 692 which amplifies the acoustic signal by ~80 dB and has 100 kHz to 2 MHz bandpass filter. The nanoindentation/scratch control software with the implemented acoustic signal processing and Machine/Deep Learning algorithms resides on the host PC with a dedicated GPU or computing Cloud.

The ultrasonic monitoring system consists of the ultrasonic nanoindentation tip 610, and fast ADC/DAC of 672 which is synchronized with the nanoindenter controller 662. The ultrasonic nanoindentation tip 610 generates a few nanometers displacement and registers returning ultrasonic wave signals during nanoindentation. During testing, it is operated in the passive pickup mode while an active mode is used for initial calibration and ultrasonic wave generation.

The differential capacitance measurement can be formalized by the following expression:

$$I_{out} = V_f \overline{\omega}(C_1 - C_2) = 8.854 * 10^{-12} * V_f \overline{\omega} A \frac{2x}{d^2}$$

Here, the output current $I_{out}$ is measured on the differential capacitance channels of $C_1$ and $C_2$. A is a capacitive electrode area, x—is the moving distance of the shaft, and d is the fixed distance between plates. $\overline{\omega}$ is a cyclic frequency while $V_f$ is applied voltage.

The ultrasonic nanoindentation tip 610 is used in the synchronized active ultrasonic monitoring. In the active ultrasonic mode piezoelectric elements operate on a combination of direct and inverse piezo effect where one of the elements is driven by the resonance frequency voltage input 662. The other element acts as an ultrasonic wave signal pickup 664 collecting ultrasonic wave energy transmitted via shaft and diamond tip. Having both piezoactive and passive elements available, the ultrasonic nanoindentation tip can be calibrated.

Two well-accepted theoretical models can be considered in deriving relationship between a number of nanofatigue cycles and mechanical characteristics such as film toughness $K_{IC}$, elastic modulus E and contact geometry [1, 2, 3, 9, 10]. The reversed-cycling approach is applicable for a rather low number of fatigue cycles $N_R$ and can be expressed as:

$$N_R = \alpha_1 \left(\frac{\varepsilon_f}{2\varepsilon_a^P}\right)^2$$

Where $\alpha_1 \sim 1$ is an arbitrary constant. The $\varepsilon_f$ is a monotonic true effective fracture strain which can be expressed in terms of spherical contact fracture mechanics as follows:

$$\varepsilon_f = \frac{K_{IC}^2}{\pi r \sigma_{YS} E}$$

Here, $\sigma_{YS}$ is the yield stress and r is the distance from the natural plastic flaw where the fracture strain is exceeded. At the fracture strain of $\varepsilon = \varepsilon_f$, the stress intensity is equivalent to the film fracture toughness $K_f = K_{IC}$, and E is modulus dominated by the substrate. Following the concept of geometrically necessary dislocations the plastic strain for a spherical contact $\varepsilon_a^P$ can be expressed as:

$$\varepsilon_a^P \cong \frac{a}{4R} = \left(\frac{\delta}{8R}\right)^{0.5}$$

Here, a, R and $\delta$ are the contact geometry parameters, i.e., spherical contact radius, radius of the tip and displacement into the surface, respectively. Thus, Eq. 2 for the reversed-cycling failure cycles can be rewritten as:

$$N_R \cong \frac{2R}{\delta}\left(\frac{K_{IC}^2}{\pi r \sigma_{YS} E}\right)^2$$

In this case the only unknown is r. Considering this to be a fraction Y of the slip band $I_S$ piled-up at the film which produces a light wear process induced by the increase in friction. Therefore, $K_{IC}$ is achieved at $r \sim \gamma I_S$ by the following number of fatigue cycles:

$$N_R \cong \frac{2R}{\delta}\left(\frac{K_{IC}^2}{\pi \gamma l_S \sigma_{YS} E}\right)^2$$

Ratcheting or Manson-Coffin fatigue applied to the single contact would take fewer cycles to produce failure where number of failure cycles $N_{MC}$ can be expressed as:

$$N_{MC} = \alpha_2 \left(\frac{\varepsilon_f}{\varepsilon_a^P}\right)$$

Where $\alpha_2 \sim 1$ is an arbitrary constant. In the case of a single point contact it leads to the light wear under ratcheting boundaries where failure cycles can be expressed as follows:

$$N_{MC} \cong \left(\frac{8R}{\delta}\right)^{0.5}\left(\frac{K_{IC}^2}{\pi \gamma l_S \sigma_{YS} E}\right)$$

The above equations are used to relate nanoscale spherical contact geometry, material properties, fracture toughness and anticipated nanofatigue cycles.

With reference to FIG. 16 the ultrasonic signal processing methodology will be described in greater detail. This methodology can be considered as a supervised or semi-supervised Machine/Deep Learning approach. Although overall ultrasonic signal classification is performed by the operator based on the nanoindentation/scratch Load-Unload (LUL) time-domain curve 710 mapping (FIG. 19) and other a-priori knowledge, all while Machine/Deep Learning is employed in an unsupervised mode for sorting out characteristic JTF domain signatures. Unknown/not classified ultrasonic signatures can be added by the operator based on statistical significance/newly generated knowledge.

Operation of nanoindentation/scratch induced ultrasonic monitoring system with Machine/Deep Learning classification capability 500 is shown in FIG. 16. The setup step 520 includes the instrument establishing the passive signature acquisition threshold, data sampling, waveform size, and bandpass filtering corners. In addition, nanoindentation/scratch test parameters, such as quasi-static force/displacement and application time, are set.

Once the system is setup, the tool may be controlled 530 so that the probe tip of the tool approaches the surface of an object. The surface approach step 30 involves finding the distance between the diamond stylus tip and the surface, then shifting the position laterally by a small amount. The ultrasonic nanoindentation tip frequency response is tested at this point.

The next step 534 is an actual nanoindent/scratch test that starts at the fresh surface location while monitoring ultrasonic signals. The objective of this step is finding the appropriate quasistatic load and ultrasonic excitation amplitude for reliable nanofatigue experiment on a given thin film.

Once all quasistatic and ultrasonic parameters are established the independent data collection begins 540.

Figure 19:
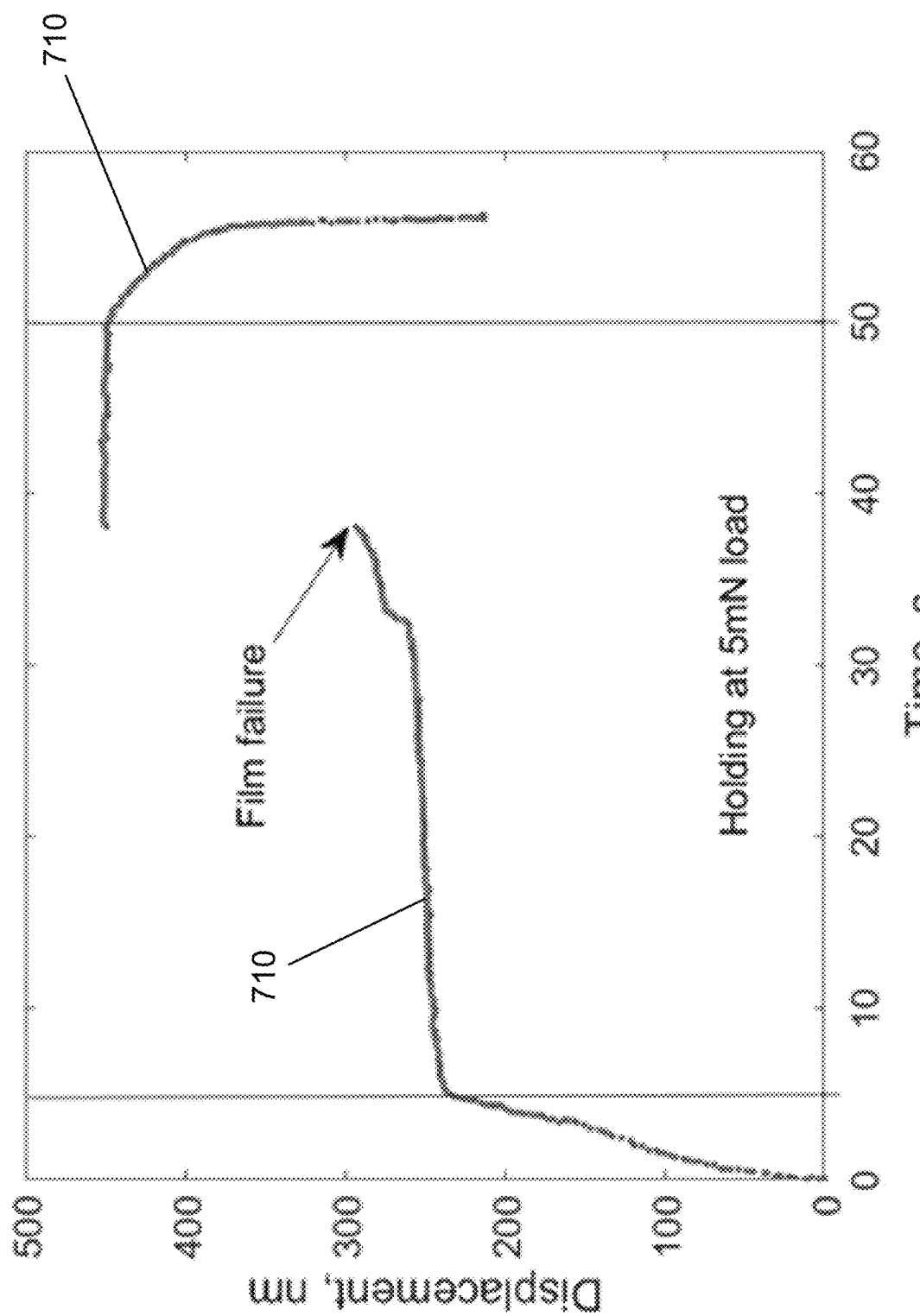
FIG. 19 is a graph illustrating a typical experimental nanoindentation load-unload curve that correlates ultrasonic tip signal events in accordance with an embodiment of the invention.

The next step 542 associates the recorded ultrasonic signals with locations on the LUL time-domain curve. This is a necessary step performed by the operator to classify events. In the case of nanoindentation and depending on the sample, ultrasonically induced film interface failure, contact adhesion, different modes of fracture/failure and resulting film delamination behavior can be classified. A typical nanoindentation LUL time-domain curve obtained by ultrasonically excited indentation into a thin film is shown in FIG. 19. Ultrasonically induced nanofatigue dynamics is illustrated by loading-unloading curve where failure point is indicated. Displacement jump afterwards indicate film delamination. At the resonance of ultrasonic tip at 272 kHz and breakthrough occurred at 10.9 million cycles. Other instruments with resonance of 10 kHz would have taken 29 min or 300 Hz—16 hours.

According to previously conducted studies, an ultrasonic signal recorded as a large excursion may be identified as a nanofatigue phenomenon. Therefore, a number of fatigue failure cycles $N_U$ derived from the ultrasonically excited nanoindentation experiments can be obtained from the LUL time-domain curve 710 at the breakthrough location time $t_B$ in this form:

$$N_U = t_B f_U$$

Here, $t_B$ provided in seconds and $f_U$ is an ultrasonic cycling frequency superimposed on the quasistatic nanoindentation load. A few nanometer in amplitude ultrasonic oscillations generate resulting ultrasonic signals that are being picked up by the ultrasonic nanoindentation tip.

Stick-slick behavior, brittle, ductile fracture, and thin film breakthrough characteristics can be identified from nano-scratch tests. In addition, a full characterization can involve other methods such as in-situ SPM imaging, FIB SEM cross-section images, and chemical analysis. This step is an operator driven step to establish initial classification of ultrasonic signals.

Figure 20:
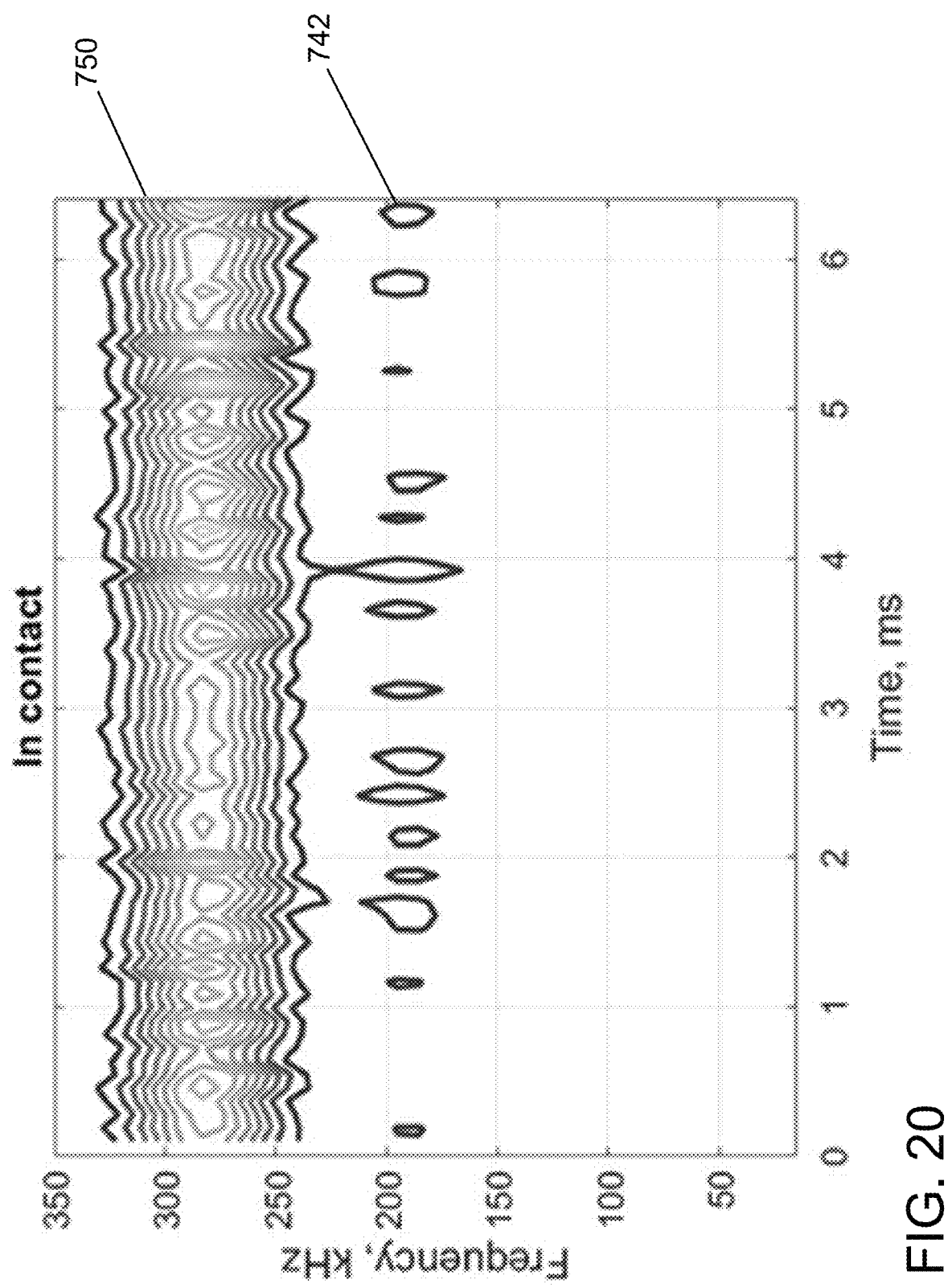
FIG. 20 is a JTF scattergram that corresponds with a recorded ultrasonic tip signal event.
Figure 21:
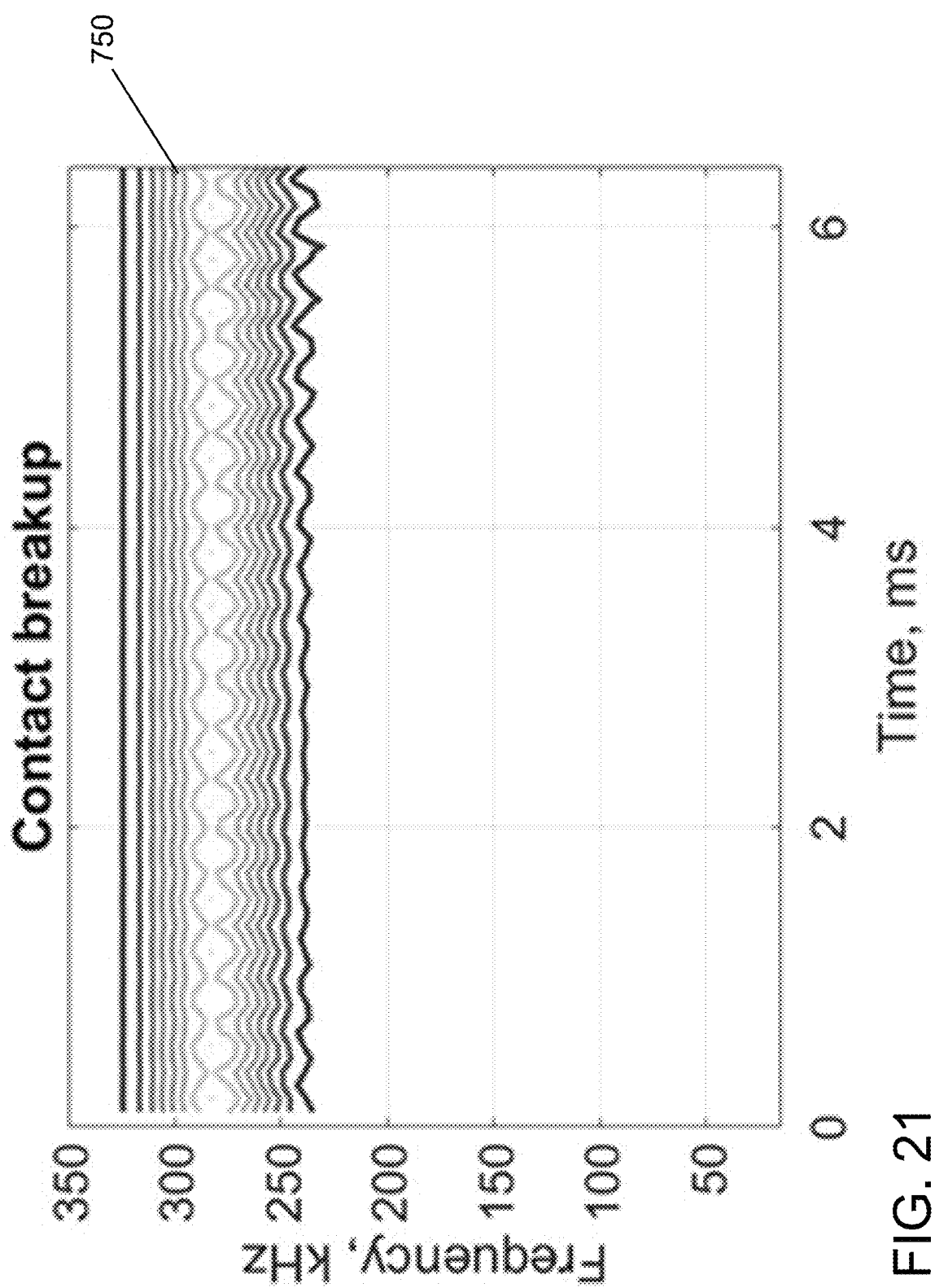
FIG. 21 is a JTF scattergram that corresponds with a recorded ultrasonic tip signal event showing contact breakup.

The JTF domain transform step 546 converts time domain ultrasonic signals into JTF domain spectrograms, see example JTF domain spectrograms at FIGS. 20 and 21. FIG. 20 illustrates a typical ultrasonic signal signature 750 during contact. The illustrated JTF domain transform demonstrates that there are variety of frequencies 742 that may be observed due to the interaction. FIG. 21 demonstrates that when contact between the ultrasonic tip and sample is braking, the oscillation pattern 750 is more stabilized and calm.

The ML/Deep learning creation/selection step 54 performs image recognition of recorded AE signatures and classifies them according to the classifications established by the operator. Here, unknown signatures undergo the operator's review on whether to be added into a new category. The setting of the ML/DL parameters step 60 involves choosing a number of images to train, set the learning rate, set the number of epochs and iterations, and to choose the optimization algorithm for training.

The next step 550 converts JTF spectrograms into acceptable graphical format images or representations for Deep Learning, classifies them 554 and prepare data for the dedicated ML/Deep Learning characterization step 564. The ML/Deep learning and characterization steps 564 and 570 start with the parameter settings 560 such as number of iterations, learning rate and optimizing algorithm. The characterization step 570 finalizes as the learning process metrics. Step 570 performs actual image recognition of recorded ultrasonic signal signatures and classifies them according to the classifications established by the operator. Here, unknown signatures undergo the operator's review on whether to be added into a new category.

Figure 22:
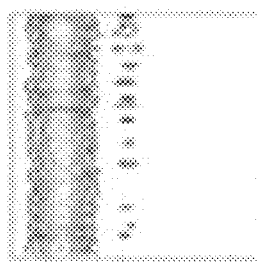
FIG. 22 are images of four trained and correctly identified ultrasonic signal events.
Figure 22:
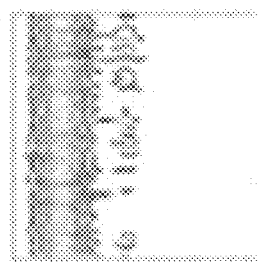
Figure 22:
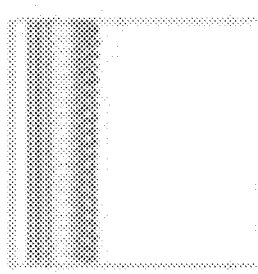
Figure 22:
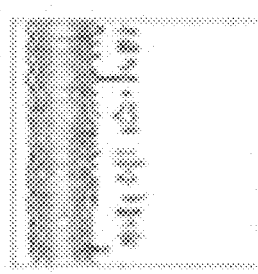

The training step 564 is completed when accuracy of 100% is reached consistently for several iterations. FIG. 22 illustrates four randomly selected non-trained spectrogram or acoustic signature images that were identified with 100% confidence. A decision is made at step 576 whether there are significant unidentified ultrasonic signals or signatures. If there are a significant number then steps 540 through 570 are repeated. If there's insufficient data then steps 530 through 570 are repeated. Once there is no longer significant unidentified ultrasonic signals, the ultrasonic signals database is updated at step 580.

In use, the nanomechanical instrument 100 is placed on a high stiffness Z-stage. A sample is positioned laterally by the XY-stage. The ultrasonic nanoindentation tip is used in the synchronized passive acoustic monitoring. In the active mode piezoelectric elements operate on a combination of direct and inverse piezo effect where one of the elements is driven by the resonance frequency input. The other element acts as a signal pickup. In the passive mode, a piezo electric element works as a signal receiver collecting acoustics wave energy transmitted via shaft and diamond tip. Having both active and passive modes available, the ultrasonic nanoindentation tip can be calibrated. In some embodiments the AE sensor may only have a receiver. The nanoindentor tip is particularly useful for nanoindentation induced AE signal characterization or nanofatigue characterization.

These and various other aspects and features of the invention are described with the intent to be illustrative, and not restrictive. This invention has been described herein with detail in order to comply with the patent statutes and to provide those skilled in the art with information needed to apply the novel principles and to construct and use such specialized components as are required. It is to be understood, however, that the invention can be carried out by specifically different constructions, and that various modifications, both as to the construction and operating procedures, can be accomplished without departing from the scope of the invention. Further, in the appended claims, the transitional terms comprising and including are used in the open ended sense in that elements in addition to those enumerated may also be present. Other examples will be apparent to those of skill in the art upon reviewing this document.

What is claimed is:

1. A method of characterizing micro regions of a surface of an object, the method comprising:
   calibrating a metrology or topology micro tool having a micro tool probe tip;
   contacting a micro region of a surface of an object utilizing the micro tool probe tip of the metrology or topology micro tool;
   acquiring ultrasonic signals associated with contact between the micro tool probe tip and the surface of the object;
   correlating ultrasonic signals with data points on a load unload curve;
   creating renderings representative of correlated ultrasonic signals;
   comparing the renderings with known event data; and
   characterizing the micro region of the surface of the object dependent upon the compared renderings.

2. The method as recited in claim 1, wherein the method further comprises decomposing the ultrasonic signal and representing the signal in a joint time-frequency domain.

3. The method as recited in claim 2 wherein the joint time frequency domain includes at least one of continuous wavelet transforms, matching pursuit, Wigner-Ville, curvelets, ridgelets, and shearlets.

4. The method as recited in claim 2, wherein the joint time frequency domain consist of deterministic, stochastic and harmonic components.

5. The method as recited in claim 1 wherein characterizing the micro region of the surface of the object includes the use of convolutive neural networks.

6. A method of characterizing micro regions of a surface of an object, the method comprising:
   calibrating a metrology or topology micro tool probe, wherein the micro tool probe includes:
      a casing having an enclosed bottom and top;
      a probe tip holder having an end extending out of the bottom of the casing;
      a probe tip coupled to the probe tip holder;
      a support ring engaged with the probe tip holder to support the probe tip holder above the bottom of the casing;
      a micro actuator engaged to the support ring, the micro actuator including:
         a first planar spring;
         a second planar spring; and
         a spacer sandwiched between the first planar spring and the second planar spring;
   contacting a micro region of a surface of an object utilizing the micro tool probe;
   acquiring ultrasonic signals associated with contact between the probe tip and the surface of the object;
   correlating the acquired ultrasonic signals with data points on a load unload curve;
   creating renderings representative of correlated ultrasonic signals;
   comparing the created renderings with known event data; and
   characterizing the micro region of the surface of the object dependent upon the compared renderings.

7. The method as recited in claim 6, wherein the method further comprises decomposing the ultrasonic signal and representing the signal in a joint time-frequency domain.

8. The method as recited in claim 7, wherein the joint time frequency domain includes at least one of continuous wavelet transforms, matching pursuit, Wigner-Ville, curvelets, ridgelets, and shearlets.

9. The method as recited in claim 8, wherein the joint time frequency domain consist of deterministic, stochastic and harmonic components.

10. The method as recited in claim 6 wherein characterizing the micro region of the surface of the object includes the use of convolutive neural networks.

11. The method as recited in claim 6, wherein the micro tool probe further includes an acoustic sensor correlated with the probe tip.

12. The method as recited in claim 11, wherein the micro actuator provides quasi-static load on contact between the probe tip and an object.

13. A micro tool probe for use with a micro tool probe tip of a metrology or topology tool, the micro tool probe comprising:
   a casing having an enclosed bottom and top;
   a probe tip holder having an end extending out of the bottom of the casing;
   a probe tip coupled to the probe tip holder;
   a support ring engaged with the probe tip holder to support the probe tip holder above the bottom of the casing;
   a micro actuator engaged to the support ring, the micro actuator including:
      a first planar spring;
      a second planar spring; and
      a spacer sandwiched between the first planar spring and the second planar spring;
   an acoustic sensor spaced apart and aligned with the probe tip;
   a signal conditioner and JTF domain transforms; and
   a rendering generator.

14. The micro tool probe as recited in claim 13, wherein the acoustic sensor is capable of acquiring acoustic emission event signals within a 20 kHz-4 MHz bandwidth.

15. The micro tool probe as recited in claim 14, further including a signal conditioner coupled to the acoustic sensor.

16. The micro tool probe as recited in claim 13, wherein the probe tip is capable of acquiring ultrasonic signal signatures within 20 kHz-4 MHz bandwidth.

17. The micro tool probe as recited in claim 13, wherein the first and second planar springs include a thin film piezo layer deposited on planar surfaces of the first and second planar springs.

18. The micro tool probe as recited in claim 13, wherein actuation of the first and second planar springs is accomplished by applying an electrical voltage potential to the first and second planar springs.

19. The micro tool probe as recited in claim 13, wherein the probe tip includes ultrasonic signal acquisition integrated with the probe tip.

20. The micro tool probe as recited in claim 13, wherein the micro actuator provides quasi-static load on contact between the probe tip and an object.

* * * * *